(12) United States Patent
Spillane et al.

(10) Patent No.: US 7,639,953 B2
(45) Date of Patent: Dec. 29, 2009

(54) COMPACT SYSTEMS FOR GENERATING POLARIZATION-ENTANGLED PHOTONS

(75) Inventors: Sean Spillane, Mountain View, CA (US); Charles Santori, Sunnyvale, CA (US); Marco Fiorentino, Mountain View, CA (US); Raymond G. Beausoliel, Redmond, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 542 days.

(21) Appl. No.: 11/494,815

(22) Filed: Jul. 27, 2006

(65) Prior Publication Data

US 2008/0037996 A1 Feb. 14, 2008

(51) Int. Cl.
*H04B 10/02* (2006.01)

(52) U.S. Cl. .......................... 398/176; 398/152; 398/65; 398/175; 385/122; 385/129; 385/147; 359/332; 359/326; 372/21; 372/22; 250/216; 250/225; 250/214.1

(58) Field of Classification Search .................. 398/212, 398/65, 152, 102, 183, 184, 173, 174, 175, 398/176, 178, 180; 385/122, 129, 147; 359/332, 359/326; 372/21, 22, 43.01; 250/216, 225, 250/214.1
See application file for complete search history.

(56) References Cited

U.S. PATENT DOCUMENTS

| | | | | |
|---|---|---|---|---|
| 5,596,667 | A | * | 1/1997 | Watanabe .................... 385/122 |
| 7,373,059 | B2 | * | 5/2008 | Spillane et al. ............. 385/122 |
| 7,489,436 | B1 | * | 2/2009 | Fiorentino et al. .......... 359/326 |

FOREIGN PATENT DOCUMENTS

| | | |
|---|---|---|
| JP | 2006/091171 | 4/2006 |
| WO | WO03/019284 | 3/2003 |

OTHER PUBLICATIONS

P Trojek et al—"Compact source of polarization-entangled photon pairs"—Optics Express vol. 12 No. 2 Jan. 26, 2004.
M Fiorentino et al—"Generation of iltrabright tunable polarization entanglement without spatial, spectral or temporal constraints"—Phys Review A vol. 69 No. 4 Apr. 2004.
M Fiorentino et al—Ultrabright tunable photon-pair source with total-flux polarization-entanglement-Quantum Electronics and Laser Science 2003—pp. 919-921.
T Kim et al—Phase-stable source of polarization-entangled photons using a polarization Sagnac interferometer-Physical Review A vol. 73 Jan. 2006—pp. 12316-1.

* cited by examiner

*Primary Examiner*—Hanh Phan

(57) ABSTRACT

Various embodiments of the present invention are directed to compact systems for generating polarization-entangled photons. In one embodiment of the present invention, a non-degenerate, polarization-entangled photon source comprises a half-wave plate that outputs both a first pump beam and a second pump beam, and a first beam displacer that directs the first pump beam into a first transmission channel and the second pump beam into a second transmission channel. A down-conversion device converts the first pump beam into first signal and idler photons and converts the second pump beam into second signal and idler photons. A second beam displacer directs both the first signal and idler photons and the second signal and idler photons into a single transmission channel. A dichroic mirror directs the first and second signal photons to a first fiber optic coupler and the first and second idler photons to a second fiber optic coupler.

23 Claims, 23 Drawing Sheets

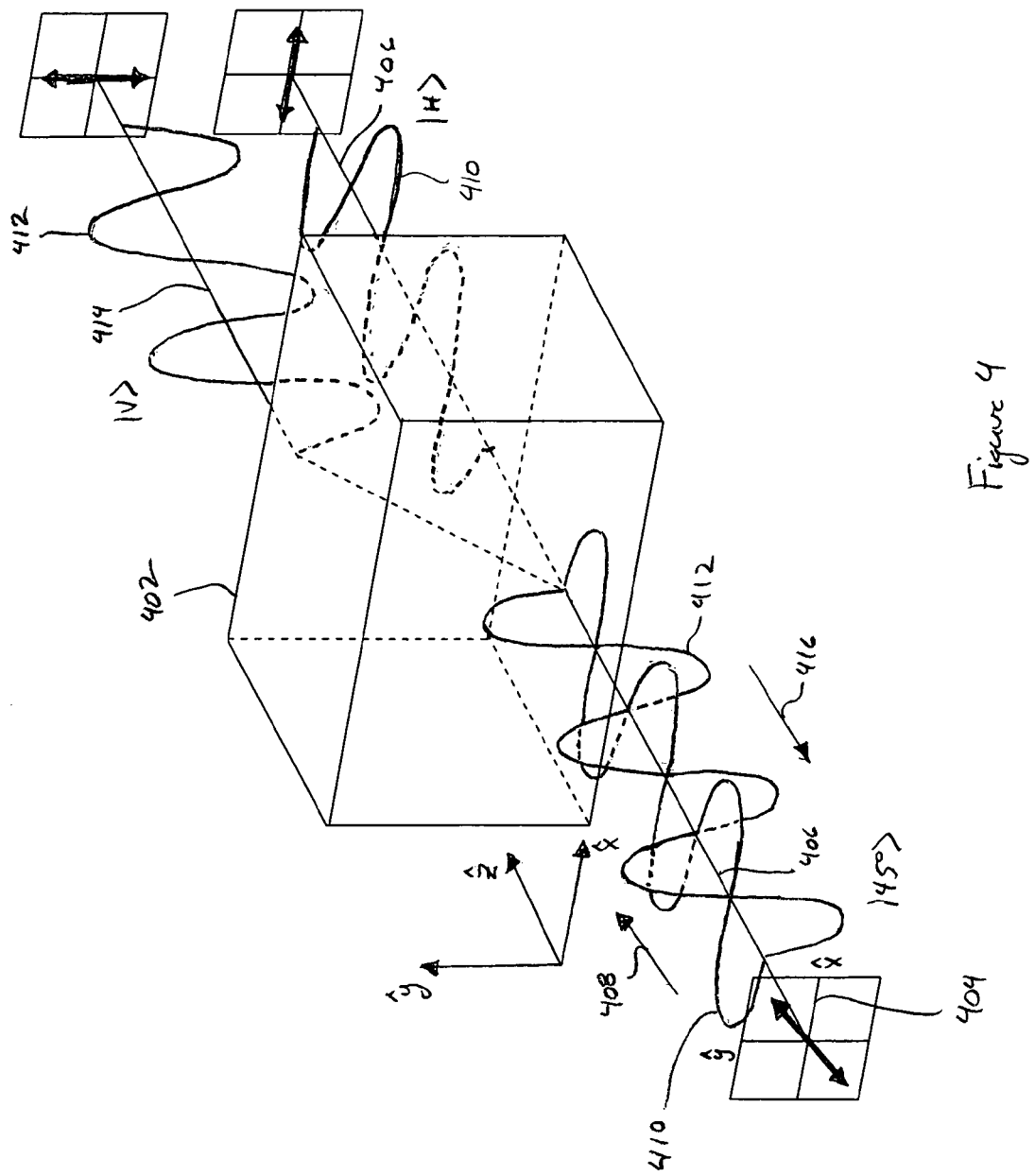

COMPACT SYSTEMS FOR GENERATING POLARIZATION-ENTANGLED PHOTONS

TECHNICAL FIELD

Systems of the present invention relate to optical devices, and in particular, to compact systems for generating photons in polarization-entangled states.

BACKGROUND OF THE INVENTION

Recent and promising advancements in fields ranging from materials science to quantum physics are now being used to produce new quantum-system-based technologies. In particular, certain quantum systems can be used to encode and transmit quantum information. Quantum systems comprising just two discrete states, represented by "$|0\rangle$" and "$|1\rangle$," can potentially be employed in a variety of quantum-system-based applications including quantum information encoding and processing, optical quantum lithography, and metrology. In general, a quantum system comprising two discrete states is called a "qubit system," and the states $|0\rangle$ and $|1\rangle$, called "qubit basis states," can also be represented in set notation as $\{|0\rangle,|1\rangle\}$. Vertically and horizontally polarized photons are examples of basis states of a two-state quantum system based on electromagnetic radiation. A qubit system can exist in the state $|0\rangle$, the state $|1\rangle$, or in any of an infinite number of states that simultaneously comprise both $|0\rangle$ and $|1\rangle$, which can be mathematically represented as a linear superposition of states:

$$|\psi\rangle = \alpha|0\rangle + \beta|1\rangle$$

The state $|\psi\rangle$ is called a "qubit," and the parameters $\alpha$ and $\beta$ are complex-valued coefficients satisfying the condition:

$$|\alpha|^2 + |\beta|^2 = 1$$

Performing a measurement on a quantum system is mathematically equivalent to projecting the state of the quantum system onto one of the basis states, and, in general, the probability of projecting the state of the quantum system onto a basis state is equal to the square of the coefficient associated with the basis state. For example, when the state $|\psi\rangle$ of the qubit system is measured in the basis $\{|0\rangle, |1\rangle\}$, one has a probability $|\alpha|^2$ of finding the quantum system in the state $|0\rangle$ and a probability $|\beta|^2$ of finding the quantum system in the state $|1\rangle$.

The infinite number of pure states associated with a qubit system can be geometrically represented by a unit-radius, three-dimensional sphere called a "Bloch sphere":

$$|\psi\rangle = \cos\left(\frac{\theta}{2}\right)|0\rangle + e^{i\phi}\sin\left(\frac{\theta}{2}\right)|1\rangle$$

where $0 \leq \theta < \pi$, and $0 \leq \phi < 2\pi$.

FIG. 1 illustrate a Bloch sphere representation of a qubit system. In FIG. 1, lines 101-103 are orthogonal x, y, and z Cartesian coordinate axes, respectively, and a Bloch sphere 106 is centered at the origin. There are an infinite number of points on the Bloch sphere 106, each point representing a unique state of a qubit system. For example, a point 108 on the Bloch sphere 106 represents a unique state of a qubit system that simultaneously comprises, in part, the state $|0\rangle$ and, in part, the state $|1\rangle$. However, once the state of the qubit system is measured in the basis $\{|0\rangle,|1\rangle\}$, the state of the qubit system is projected onto the state $|0\rangle$ 110 or onto the state $|1\rangle$ 112.

The state of a system comprising two or more qubit systems is represented by a tensor product of qubits, each qubit associated with one of the qubit systems. For example, consider a system comprising a first qubit system and a second qubit system that is represented by the state:

$$|\psi\rangle_{12} = |\psi\rangle_1 |\psi\rangle_2$$

where the state of the first qubit system is:

$$|\psi\rangle_1 = \frac{1}{\sqrt{2}}(|0\rangle_1 + |1\rangle_1)$$

and the state of the second qubit system is:

$$|\psi\rangle_2 = \frac{1}{\sqrt{2}}(|0\rangle_2 + |1\rangle_2)$$

The state $|\psi\rangle_2$ can also be rewritten as a linear superposition of states:

$$|\psi\rangle_{12} = |\psi\rangle_1 |\psi\rangle_2$$
$$= \frac{1}{2}(|0\rangle_1|0\rangle_2 + |0\rangle_1|1\rangle_2 + |1\rangle_1|0\rangle_2 + |1\rangle_1|1\rangle_2)$$

where the terms $|0\rangle_1|0\rangle_2$, $|0\rangle_1|1\rangle_2$, $|1\rangle_1|0\rangle_2$, and $|1\rangle_1|1\rangle_2$ are basis of the tensor product space. Each product state in the state $|\psi\rangle_{12}$ has an associated coefficient of ½, which indicates that when the state of the first qubit system is measured in the bases $\{|0\rangle_1,|1\rangle_1\}$, and the state of the second qubit system is measured in the basis $\{|0\rangle_2,|1\rangle_2\}$, there is a ¼ ($|½|^2$) probability of the combined qubit systems being found in any one of the product states. Certain state of the combined qubit systems, however, cannot be represented by a product of associated qubits. These qubit systems are said to be "entangled." Quantum entanglement is a property of quantum mechanics in which the states of two or more quantum systems are correlated, even though the quantum systems can be spatially separated. An example entangled state representation of an entangled two-qubit system is:

$$|\psi^+\rangle_{12} = \frac{1}{\sqrt{2}}(|0\rangle_1|1\rangle_2 + |1\rangle_1|0\rangle_2)$$

The entangled state $|\psi^+\rangle_{12}$ cannot be factored into a product of the qubits $\alpha_1|0\rangle_1 + \beta_1|1\rangle_1$ and $\alpha_2|0\rangle_2 + \beta_2|1\rangle_2$, for any choice of the parameters $\alpha_1$, $\beta_1$, $\alpha_2$, and $\beta_2$.

The state of an un-entangled, two-qubit system can be distinguished from the state of an entangled, two-qubit system as follows. Consider an un-entangled, two-qubit system in the state $|\psi\rangle_{12}$. Suppose a measurement performed on the first qubit system in the basis $\{|0\rangle_1,|1\rangle_1\}$ projects the state of the first qubit system onto the state $|0\rangle_1$. According to the state $|\psi\rangle_{12}$, the state of the un-entangled, two-qubit system immediately after the measurement is the linear superposition of states $(|0\rangle_1|0\rangle_2+|0\rangle_1|1\rangle_2)/\sqrt{2}$. When a second measurement is performed on the second qubit system in the basis $\{|0\rangle_2,|1\rangle_2\}$ immediately following the first measurement in an identical reference frame, there is a ½ probability of projecting the state of the second qubit system onto the state $|0\rangle_2$ and a ½ probability of projecting the state of the second qubit system onto the state $|1\rangle_2$. In other words, the state of the second qubit system is not correlated with the state of the first qubit system.

In contrast, consider an entangled, two-qubit system in the entangled state $|\psi^+\rangle_{12}$. Suppose that a first measurement performed on the first qubit system in the basis $\{|0\rangle_1,|1\rangle_1\}$ also projects the state of the first qubit system onto the state $|0\rangle_1$. According to the entangled state $|\psi^+\rangle_{12}$, the state of the entangled, two-qubit system after the first measurement is the product state $|0\rangle_1|1\rangle_2$. When a second measurement is performed on the second qubit system in the basis $\{|0\rangle_2,|1\rangle_2\}$, the state of the second qubit system is $|1\rangle_2$ with certainty. In other words, the state of the first qubit system $|0\rangle_1$ is correlated with the state of the second qubit system $|1\rangle_2$.

Entangled quantum systems have a number of different and practical applications in fields ranging from quantum computing to quantum information processing. In particular, polarization entangled-photons can be used in quantum information processing, quantum cryptography, teleportation, and linear optics quantum computing. The term "photon" refers to a single quantum of excitation of a mode of the electromagnetic field. Note that an electromagnetic wave comprises both an electric field component, $\vec{E}$, and an orthogonal magnetic field component, $\vec{B}$. However, because the amplitude of the magnetic field component $B_0$ is smaller than the amplitude of the electric field component $E_0$ by a factor of $1/c$, where c represents the speed of light in free space ($c=3.0\times10^8$ m/sec), the electric field component accounts for most the electromagnetic wave interactions with matter. As a result, a polarization state of an electromagnetic wave is typically represented by the electric field component alone.

FIGS. 2A-2B illustrates vertically and horizontally polarized photon basis states, respectively, that can be used as basis states for polarization entangled-photons. In FIGS. 2A-2B, vertically and horizontally polarized photons are represented by oscillating continuous waves propagating along z-coordinate axes 202 and 204, respectively. As shown in FIG. 2A, a vertically polarized photon $|V\rangle$ oscillates in the yz-plane. Directional arrow 206 in xy-plane 208 represents one complete oscillatory cycle as $|V\rangle$ advances along the z-coordinate axis 202 through one complete wavelength. In FIG. 2B, a horizontally polarized photon $|H\rangle$ oscillates in the xz-plane. Directional arrow 210 in xy-plane 212 represents one complete oscillatory cycle as $|H\rangle$ advances along the z-coordinate axis 204 through one complete wavelength.

The Bell states:

$$|\psi^-\rangle = \frac{1}{\sqrt{2}}(|H\rangle_1|V\rangle_2 - |V\rangle_1|H\rangle_2),$$

$$|\psi^+\rangle = \frac{1}{\sqrt{2}}(|H\rangle_1|V\rangle_2 + |V\rangle_1|H\rangle_2),$$

$$|\phi^-\rangle = \frac{1}{\sqrt{2}}(|H\rangle_1|H\rangle_2 - |V\rangle_1|V\rangle_2), \text{ and}$$

$$|\phi^+\rangle = \frac{1}{\sqrt{2}}(|H\rangle_1|H\rangle_2 + |V\rangle_1|V\rangle_2)$$

where subscript "1" represents a first transmission channel; and subscript "2" represents a second transmission channel.

are examples of polarization entangled-photons that can be used in a number of different entangled-state applications.

Although polarization-entangled photons have a number of potentially useful applications, polarization-entangled photon sources typically cannot be practically implemented in a wide variety of entangled state applications. For example, in "New High-Intensity Source of Polarization-Entangled Photon Pairs," by Kwiat et al., *Physical Review Letters*, vol. 75, 4337, (1995), Kwiat describes a high-intensity source of polarization entangled-photon Bell states that works for continuous electromagnetic waves but not for electromagnetic wave pulses. In addition, only photons emitted in a particular direction are entangled. As a result, only a limited number of Bell states can be generated. In "Ultrabright source of polarization-entangled photons," by Kwiat et al., *Physical Review A*, vol. 60, R773, (1999), Kwiat also describes a source of polarization-entangle photon pairs. However, thin crystals and continuous wave pumps have to be used in order to obtain good entanglement. In "Phase-stable source of polarization-entangled photons using a polarization Sagnac interferometer," by Taehyun Kim et al., *Physical Review A*, vol. 73, 012316 (2006) and in "Generation of ultrabright tunable polarization entanglement without spatial, spectral, or temporal constraints," by Fiorentino et al., *Physical Review A*, vol. 69, 041801(R) (2004), both Kim and Fiorentino describe an ultrabright parametric down-conversion source of Bell state polarization-entangled photons. However, these polarization-entangled photon sources cannot be used in microscale applications, are expensive to produce, and need periodic adjustments. Physicist, computer scientist, and entangled state users have recognized a need for polarization entangled-photon sources that are compatible with both continuous wave and pulse pump sources and can be coupled to fiber optic couplers for implementation in microscale devices.

SUMMARY OF THE INVENTION

Various embodiments of the present invention are directed to compact systems for generating polarization-entangled photons. In one embodiment of the present invention, a non-degenerate, polarization-entangled photon source comprises a half-wave plate that receives a pump beam from a pump beam source and outputs both a first pump beam in a first polarization state and a second pump beam in a second polarization state. A first beam displacer directs the first pump beam into a first transmission channel and directs the second pump beam into a second transmission channel, based on the first and second polarization states of the first and second pump beams. The entangled photon source may also include a down-conversion device that receives the first pump beam and outputs a first signal photon and a first idler photon in the first transmission channel and receives the second pump beam and outputs a second signal photon and a second idler photon in the second transmission channel. A second beam displacer can be included to direct both the first signal and idler photons transmitted in the first transmission channel and the second signal and idler photons transmitted in the second transmission channel into a single output transmission channel. A dichroic mirror directs the first and second signal photons to a first fiber optic coupler and directs the first and second idler photons to a second fiber optic coupler.

BRIEF DESCRIPTION OF THE DRAWINGS

FIG. 4 illustrates a perspective view of a hypothetical beam displacer that distinguishes between vertically and horizontally polarized electromagnetic waves.

DETAILED DESCRIPTION OF THE INVENTION

Various embodiments of the present invention are directed to compact systems for generating polarization entangled photons. In particular, certain system embodiments of the present invention can be used to generate polarization-entangled photons in the Bell states. In order to assist the reader in understanding descriptions of various embodiments of the present invention, an overview of half-wave plates, beam displacers, spontaneous parametric down conversion, and periodic poling is provided in a first subsection. Various system embodiments of the present invention are provided in a second subsection.

Figure 1:
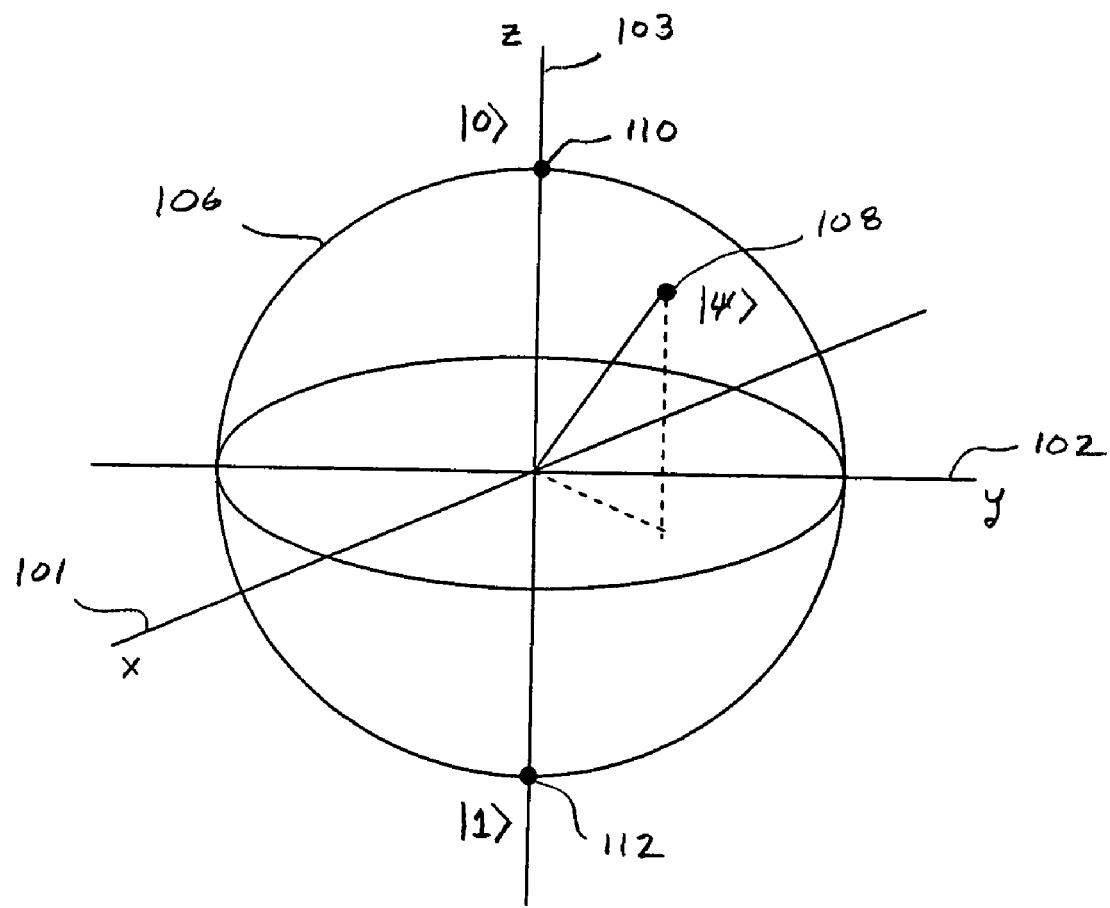
FIG. 1 illustrate a Bloch sphere representation of a qubit system.
Figure 2A:
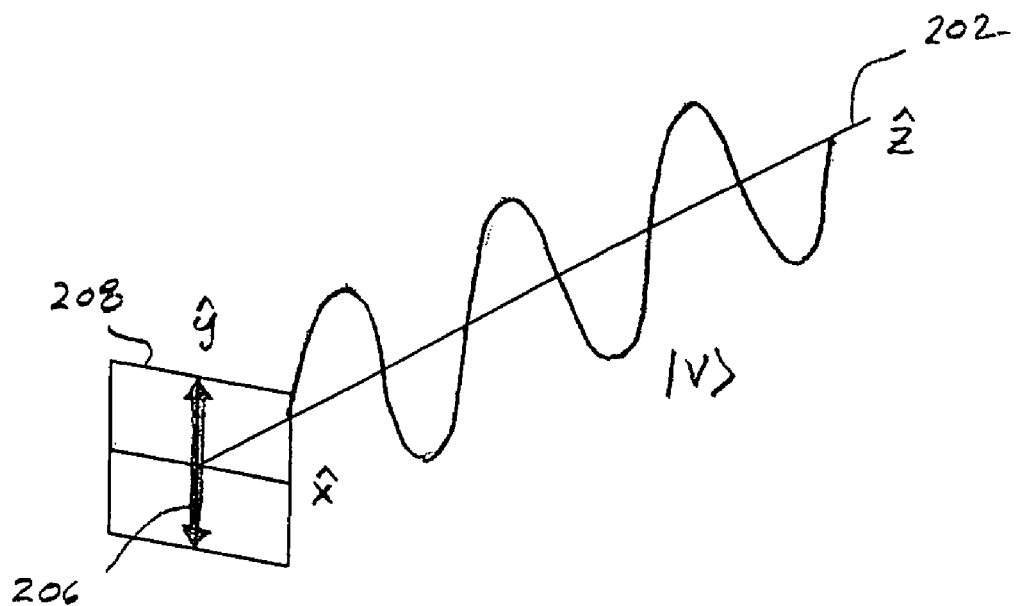
FIGS. 2A-2B illustrates vertically and horizontally polarized photon basis states.
Figure 2B:
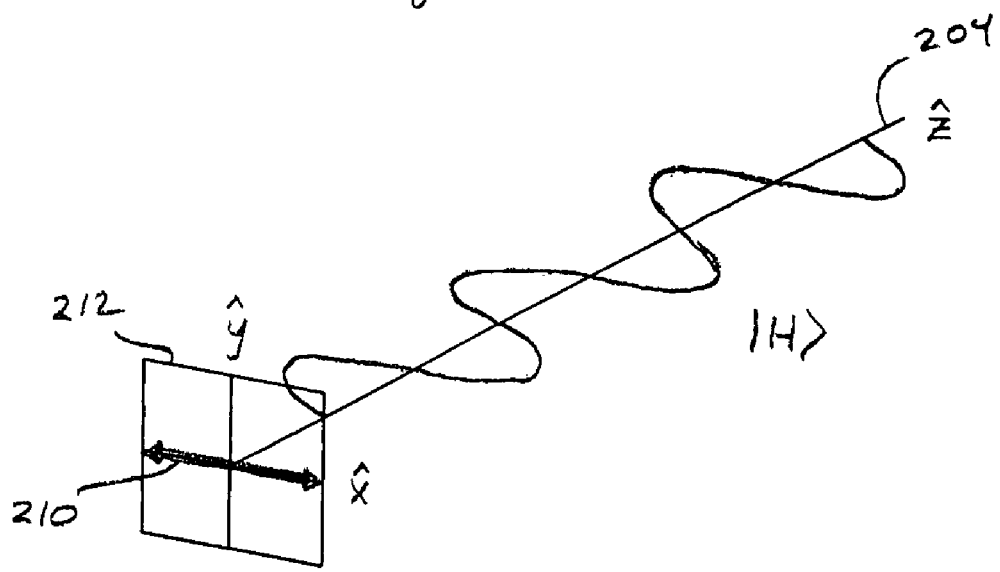
Figure 3A:
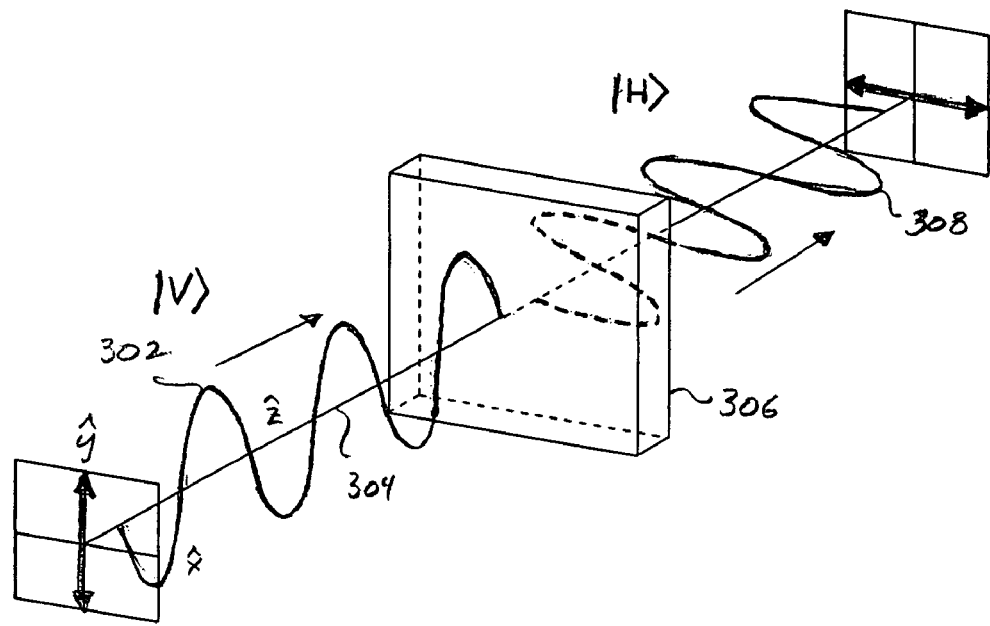
FIGS. 3A-3B illustrate polarization state changes resulting from a half-wave plate.
Figure 3B:
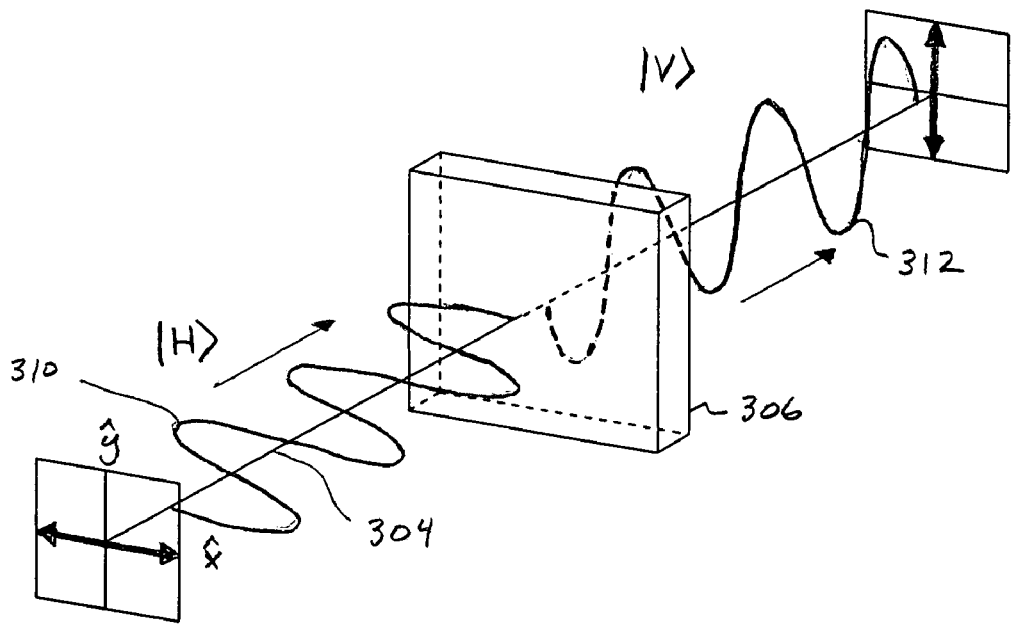

Half-wave Plates, Beam Displacers, Spontaneous Parametric-Down Conversion, and Periodic Poling A half-wave plate ("HWP") rotates the polarization of an incident linearly polarized photon by an angle that is twice the angle formed by the incident polarization and the half-wave plate axis. For example, a HWP with its axis forming a 45° angle with respect to a horizontal direction rotates an incident vertically polarized photon into a horizontally polarized photon, and rotates an incident horizontally polarized photon into a vertically polarized photon. FIGS. 3A-3B illustrate polarization state changes of vertically and horizontally polarized photons incident upon such a HWP, respectively. In FIG. 3A, a vertically polarized photon |V⟩ 302 propagates along a z-coordinate axis 304 and impinges on the front side of a HWP 306. As the vertically polarized photon |V⟩ 302 passes through the HWP 306, a horizontally polarized photon |H⟩ 308 emerges from the opposite side of the HWP 306. In FIG. 3B, a horizontally polarized photon |H⟩ 310 propagates along the z-coordinate axis 304 to the front side of the same HWP 306. As the horizontally polarized photon |H⟩ 310 passes through the HWP 306, a vertically polarized photon $|V\rangle$ 312 emerges from the opposite side of the HWP 306.

Beam displacers ("BDs") are birefringent crystals that display two different indices of refraction. The crystals can be comprised of calcium carbonate ($CaCO_3$), tourmaline, lithium niobate ($LiNaO_3$), and $\alpha$-barium borate ($\alpha$-BBO). Each index of refraction depends on the polarization state of an incident photon and the orientation of the BD with respect to the propagating direction of the incident photon. A BD can be used to distinguish between horizontally and vertically polarized electromagnetic waves. FIG. 4 illustrates a perspective view of a hypothetical BD 402. An incident photon polarized at 45° to an x-coordinate axis 404 propagates along in the z-direction along a first transmission channel 406 to the BD 402 in the direction identified by directional arrow 408. The incident photon can be mathematically represented by a coherent linear superposition of vertically and horizontally polarized states as follows:

$$|45°\rangle = \frac{1}{\sqrt{2}}(|H\rangle + |V\rangle)$$

where
$|H\rangle$ represents a horizontally polarized photon 410 that lies in an xz-plane of the BD 402; and
$|V\rangle$ represents a vertically polarized photon 412 that lies in a yz-plane of the BD 402.

As shown in FIG. 4, the horizontally polarized photon $|H\rangle$ 410 passes through the BD 402 undeflected and continues propagating along the first transmission channel 406, whereas the vertically polarized photon $|V\rangle$ 412 is deflected within the BD 402 and emerges on a second transmission channel 414. A BD can also be used to combine a vertically polarized photon with a horizontally polarized photon in order to obtain a coherent linear superposition of photons. For example, reversing the propagating directions of the horizontally polarized photon $|H\rangle$ 410 and the vertically polarized photon $|V\rangle$ 412 produces the 45° polarized photon $|45°\rangle$ propagating in the direction identified by a directional arrow 416.

Figure 5:
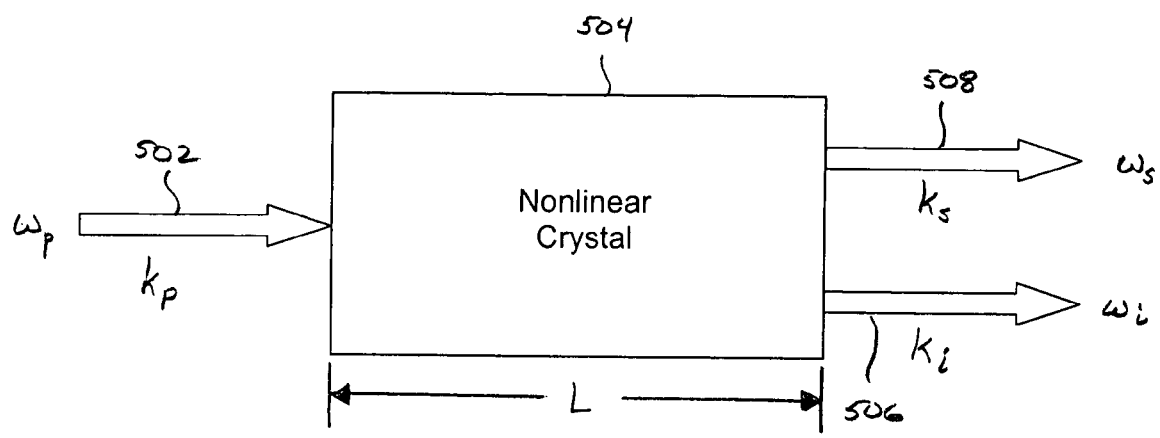
FIG. 5 illustrates a birefringent nonlinear crystal that splits a pump beam into a pair of signal and idler beams.

In spontaneous parametric-down conversion ("SPDC"), a birefringent nonlinear crystal splits an incident beam of electromagnetic radiation, called a "pump beam," into a pair of beams called a "signal beam" and an "idler beam." FIG. 5 illustrates a birefringent nonlinear crystal that splits a pump beam into a pair of signal and idler beams. In FIG. 5, a pump beam 502 with a frequency $\omega_p$ and wavenumber $k_p$ is incident on a nonlinear crystal 504 of length L. A pump beam generates a nonlinear polarization within the nonlinear crystal 504. The nonlinear polarization waves has a first component that oscillates with frequency $\omega_i$ and a second component that oscillates with frequency $\omega_s$. When the relative phases of the two nonlinear polarization waves and the initial pump wave add constructively, beams of polarized electromagnetic radiation are output with frequencies $\omega_s$ and $\omega_i$ and corresponding wavenumbers $k_s$ and $k_i$, are called a "signal beam" 508 and an "idler beam" 506, respectively.

The terms "signal" and "idler" have no special significance. As a result, the choice of beam labels is arbitrary. In the down-conversion process the quantum states of the nonlinear crystal are left unchanged. In other words, the initial and final quantum-mechanical states of the nonlinear crystal 504 are identical. The different signal and idler beams 506 and 508 output from the nonlinear crystal 504 are the result of nonlinearity and birefringence. In other words, the refractive index of the nonlinear crystal depends on the direction of polarization of the incident electromagnetic wave.

Figure 6A:
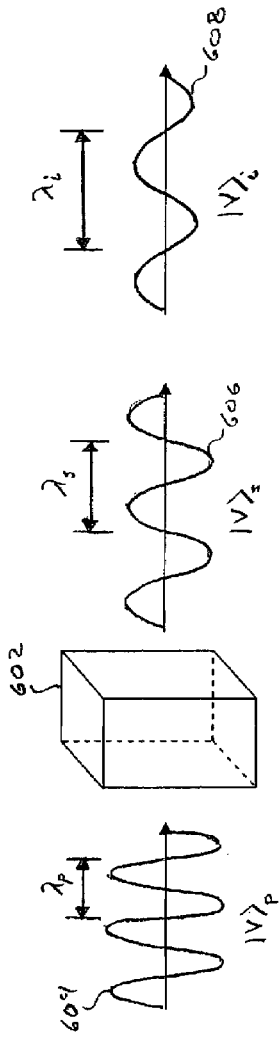
FIGS. 6A-6B illustrate two examples of Type I down-conversion.
Figure 6B:
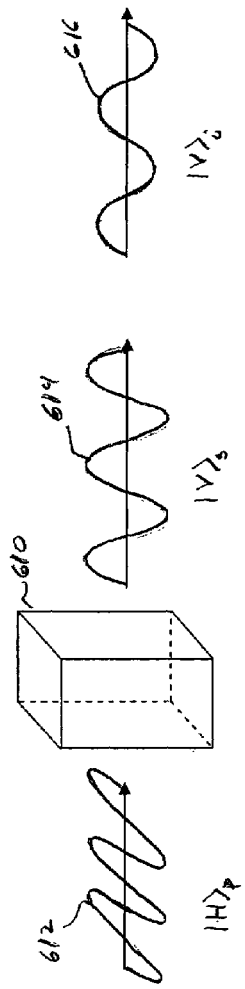
Figure 6C:
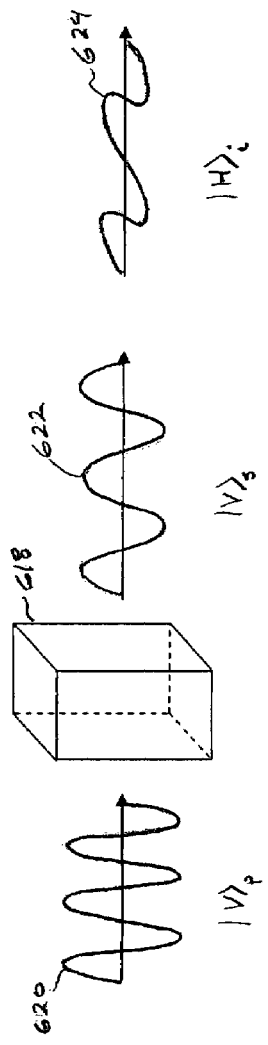
FIG. 6C illustrates an example of a Type II down-conversion.

There are two types of down-conversion processes. Type I down conversion occurs when the signal and idler beams have identical polarizations, and Type II down conversion occurs when the signal and idler beams have orthogonal polarizations. FIGS. 6A-6B illustrate two examples of Type I down-conversion. In FIG. 6A, a first Type I down-conversion crystal ("DCC") 602 receives a vertically polarized pump beam $|V\rangle_p$ 604 and outputs both a vertically polarized signal photon $|V\rangle_s$ 606 and a vertically polarized idler photon $|V\rangle_i$ 608. In FIG. 6B, a second Type I DCC 610 receives a horizontally polarized pump beam $|H\rangle_p$ 612 and outputs both a vertically polarized signal photon $|V\rangle_s$ 614 and a vertically polarized idler photon $|V\rangle_i$ 616. FIG. 6C illustrates an example of Type II down-conversion. The Type II DCC 618 receives a vertically polarized pump beam $|V\rangle_p$ 620 and simultaneously outputs both a vertically polarized signal photon $|V\rangle_s$ 622 and a horizontally polarized idler photon $|H\rangle_i$ 624.

The efficiency of a nonlinear crystal can be assessed by examining the intensities of the signal and idler beams. The intensities of the signal and idler beams can be written as:

$$I_s = I_s(\max)\left(\frac{\sin(\Delta kL/2)}{\Delta kL/2}\right)^2, \text{ and } I_i = I_i(\max)\left(\frac{\sin(\Delta kL/2)}{\Delta kL/2}\right)^2,$$

respectively, where
$I_s$ (max) and $I_i$ (max) are the maximum signal and idler beam intensities output from a nonlinear crystal;
L is the length of the nonlinear crystal; and
$\Delta k = k_p - k_s - k_i$ is called the "wavevector, or momentum, mismatch."

Figure 7A:
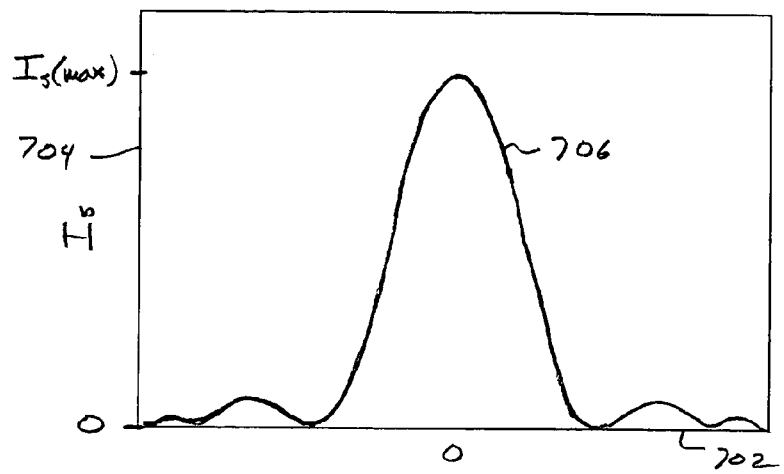
FIG. 7A is a plot of signal beam intensity.

FIG. 7A is a plot of signal beam intensity $I_s$ versus $\Delta kL/2$. As shown in FIG. 7A, horizontal axis 702 corresponds to a range of $\Delta kL/2$ values, vertical axis 704 corresponds to the signal beam intensities, and curve 706 represents the signal beam intensity as a function of $\Delta kL/2$. The curve 706 shows maximum efficiency, or intensity, when $\Delta k$ equals zero. The curve 706 also shows that as $|\Delta k|L$ increases, the efficiency of the nonlinear crystal decreases. As a result, power can flow backward from the signal and idler beams into the pump beam. The maximum efficiency ($\Delta k=0$) is achieved when the electromagnetic waves involved in the down-conversion process are phase matched so that they add constructively in the forward direction. Note that a similarly shaped intensity curve $I_i$ centered about the wavevector mismatch $\Delta k$ equal to zero can also be plotted for the idler beam.

The phase-matching condition ($\Delta k=0$) can often be obtained by carefully controlling the refractive indices associated with each of the pump, signal, and idler beams. Typically, phase matching is achieved by either angle tuning or temperature tuning, which are well-known phase-matching techniques. However, there are circumstances when angle and temperature tuning techniques are not suitable for maintaining the phase-matching condition. For example, certain nonlinear crystals may possess insufficient birefringence to compensate for the dispersion of the linear refractive indices over a wide wavelength range, and for other nonlinear crystals, electromagnetic radiation with increasingly shorter wavelengths causes the index of refraction associated with the signal beam to approach the index of refraction of the idler beam. Quasi-phase matching can be used when normal phase matching cannot be implemented.

Figure 7B:
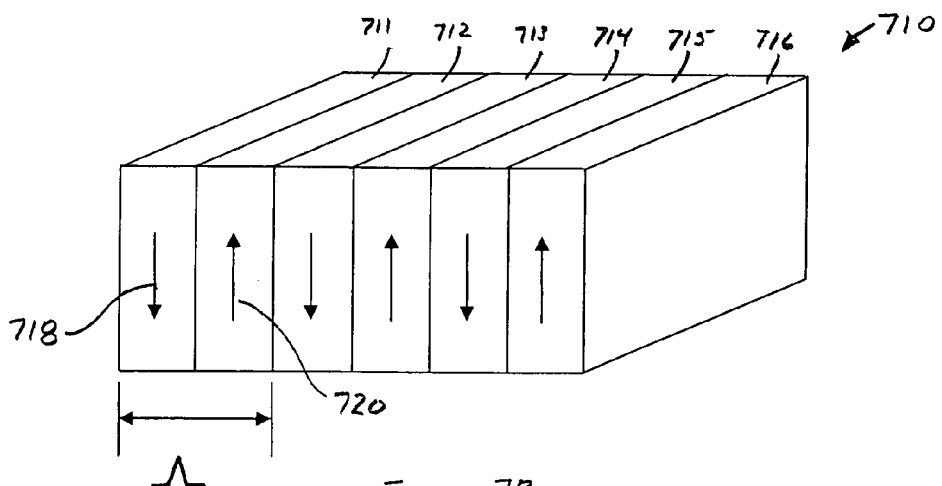
FIG. 7B illustrates a hypothetical periodically poled down-conversion crystal.

Quasi-phase matching is accomplished with periodically poled down-conversion crystals. FIG. 7B illustrates a hypothetical periodically poled down-conversion crystal 710. The down-conversion crystal 710 comprises 6 alternating layers 711-716 of the same birefrigent material. The crystal lattices of the layers 711, 713, and 715 are all oriented in the same direction, as indicated by downward directed arrows, such as downward directed arrow 718. In contrast, the crystal lattices of the layers 712, 714, and 716 are all oriented in the opposite direction of the layers 711, 712, and 715, as idicated by the upward directed arrows, such as upward directed arrow 720. The period of the alternating layers is represented by $\Lambda$. Methods for periodically poling a nonlinear crystal are well-known in the art.

Figure 7C:
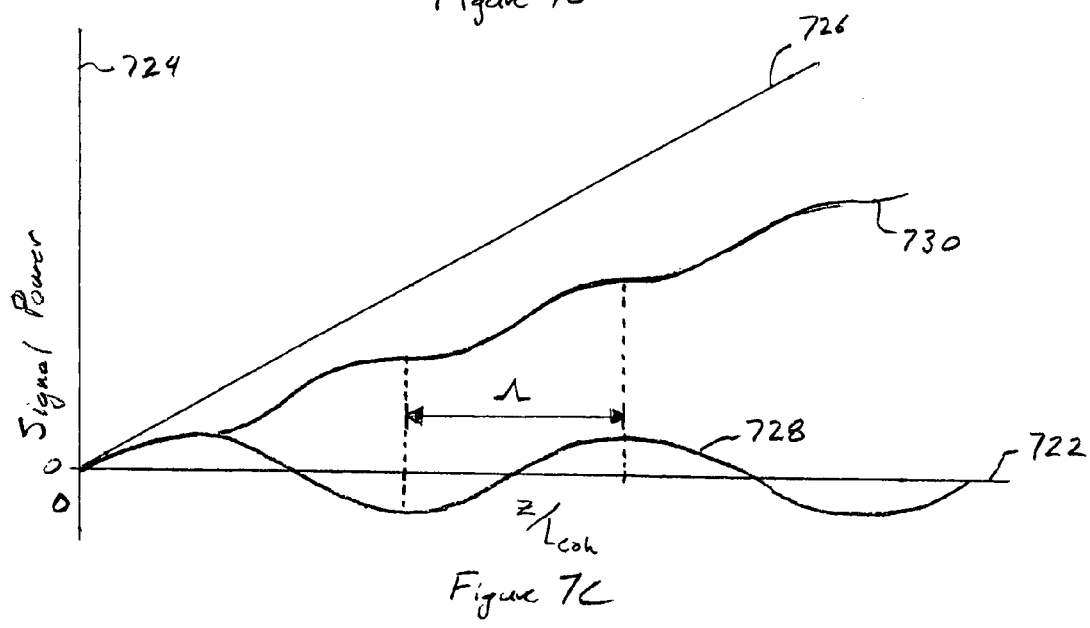
FIG. 7C is a plot of the signal power generated by a strong pump propagating through three different nonlinear crystals.

The following discussion describes how periodic poling can compensate for a non-zero wavevector mismatch $\Delta k$ by examining how the power of the signal is changed by the properties of three different nonlinear crystals. FIG. 7C is a plot of three signal powers, each associated with signals propagating through a different nonlinear crystal. As shown in FIG. 7C, horizontal axis 722 corresponds to the propagation distance within a nonlinear crystal, and vertical axis 724 corresponds to the power of the signal field propagating though a nonlinear crystal in the presence of a strong pump field. Curve 726 shows that for a perfectly phase-matched interaction ($\Delta k = 0$) with a single nonlinear crystal, the signal power grows linearly with propagation distance z. In contrast, curve 728 is also associated with a single nonlinear crystal, however, due to a nonzero wavevector mismatch, the field power oscillates. As a result, the average field power over the propagation distance of the nonlinear crystal is zero. Curve 730 is a associated with a periodically poled nonlinear crystal. The curve 730 shows that by using quasi-phase matching, when the power of the signal is about to decrease as a consequence of wavevector mismatch, a reversal occurs at the end of period $\Lambda$, which allows the power to grow monotanically. Similar considerations can be applied to the idler beam.

The wavevector mismatch for a periodically poled nonlinear crystal is give by:

$$\Delta k_Q = k_p - k_s - k_i \pm \frac{2\pi}{\Lambda},$$

and the optimum period is:

$$\Lambda = \pm \frac{2\pi}{k_p - k_s - k_i}$$

Embodiments of the Present Invention

Figure 8:
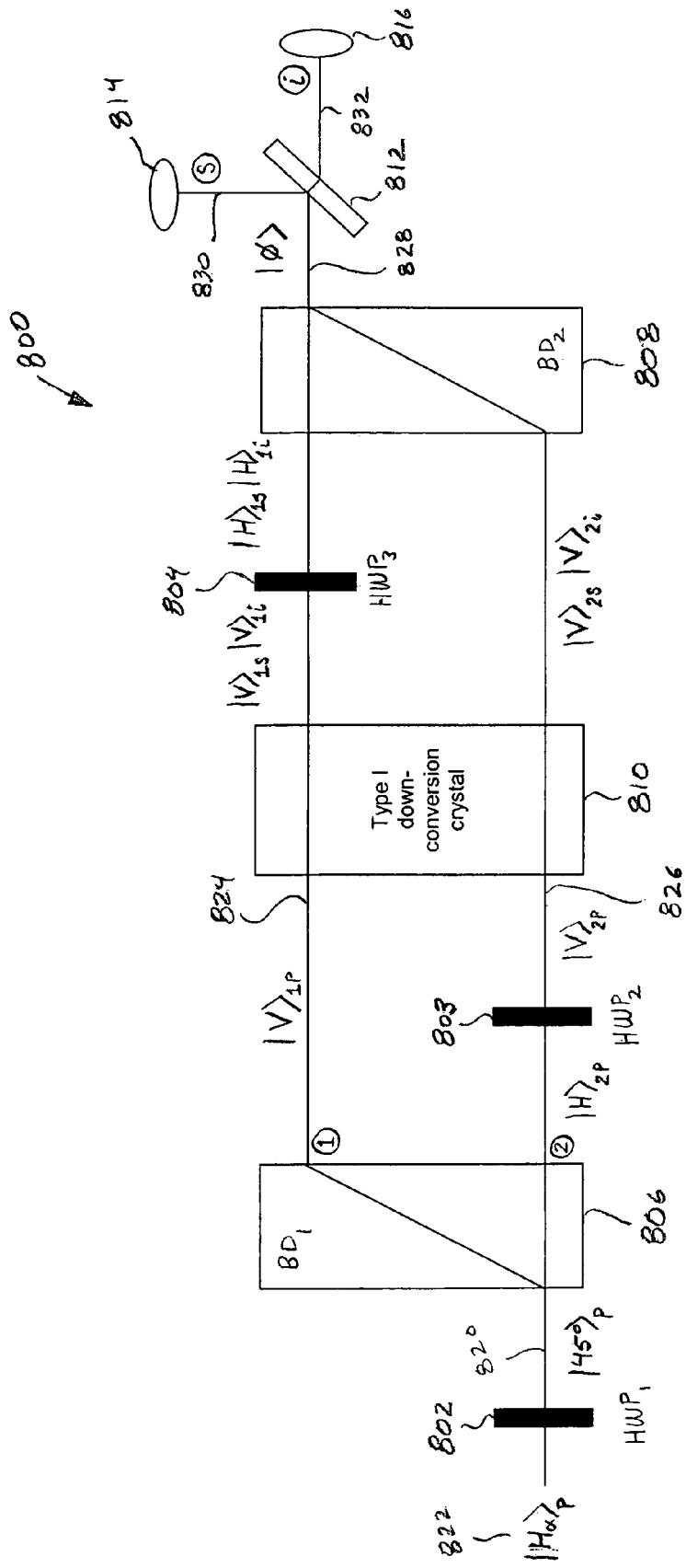
FIG. 8 illustrates a schematic plan view of a first non-degenerate polarization entangled-photon source that represents an embodiment of the present invention.

FIG. 8 illustrates a schematic plan view of a first non-degenerate polarization entangled-photon source 800 that represents an embodiment of the present invention. The entangled-photon source 800 comprises three HWPs 802-804, two BDs 806 and 808, a Type I DCC 810, a dichroic mirror 812, a first fiber optic coupler 814, and a second fiber optic coupler 816. Lines, such as line 820, represents beam transmission channels in free space. The entangled-photon source 800 receives a horizontally polarized pump beam $|H_\alpha\rangle_p$ 822 from a pump beam source (not shown). The pump beam $|H_\alpha\rangle_p$ 822 can be a continuous electromagnetic wave or an electromagnetic-wave pulse. The dichroic mirror 812 reflects "signal" labeled photons to the first fiber optic coupler 814 via a signal beam transmission channel 830 and transmits "idler" labeled photons to the second fiber optic coupler 816 via an idler beam transmission channel 832. Note that the terms "signal" and "idler" are arbitrary labels used to identify the two types of polarized photons output from the Type I DCC 810. The entangled-photon source 800 outputs polarization-entangled photons in a state:

$$|\phi\rangle = \frac{1}{\sqrt{2}}(|H\rangle_s|H\rangle_i + e^{i\theta}|V\rangle_s|V\rangle_i)$$

where $|H\rangle_s$ and $|V\rangle_s$ represent horizontally and vertically polarized signal labeled photons, respectively, transmitted in the signal beam transmission channel 830 to the first fiber optic coupler 814;

$|H\rangle_i$ and $|V\rangle_i$ represent horizontally and vertically polarized idler labeled photons, respectively, transmitted in the idler beam transmission channel 832 to the second fiber optic coupler 816; and $\theta$ is a relative phase difference between the horizontally and vertically polarized photons emitted from the BD 808. The fiber optic couplers 814 and 816 can be connected to a quantum computer, quantum information processor, a quantum-cryptographic device, quantum teleportation device or other optical-based device or network.

The following discussion describes operation of the entangled-photon source 800 to generate polarization-entangled photons in the state $|\phi\rangle$. The HWP 802 receives the pump beam $|H_\alpha\rangle_p$ 822 and outputs a pump beam of photons polarized at 45° with respect to the plane of the entangled-photon source 800. The 45° polarized pump beam photons can be mathematically represented by a coherent linear superposition of horizontally and vertically polarized photon basis states as follows:

$$|45°\rangle = \frac{1}{\sqrt{2}}(|H\rangle_p + |V\rangle_p)$$

where $|H\rangle_p$ and $|V\rangle_p$ represent horizontally and vertically polarized pump beam basis states, respectively.

Note that the polarization direction of the horizontally polarized pump beam $|H\rangle_p$ is parallel to the plane of the entangled-photon source 800, and the polarization direction of the vertically polarized pump beam $|V\rangle_p$ is perpendicular to the plane of the entangled-photon source 800.

The BD 806 receives the pump beam $|45°\rangle$ and redirects the vertically polarized pump beam $|V\rangle_p$ into a first transmission channel 824 and transmits the horizontally polarized pump beam $|H\rangle_p$ undisturbed into a second transmission channel 826. After the vertically and horizontally polarized photons are represented by the BD 806, the polarized pump beams are transmission channel dependent. In other words, the state of the photons can be represented by a coherent linear superposition of states:

$$\frac{1}{\sqrt{2}}(|H\rangle_{2p} + |V\rangle_{1p})$$

where
the subscript "1" identifies the first transmission channel 824; and the subscript "2" identifies the second transmission channel 826.

The HWP 803 receives the horizontally polarized pump beam $|H\rangle_{2p}$ transmitted in the second transmission channel 826 and outputs a vertically polarized pump beam $|V\rangle_{2p}$. After the HWP 803, the polarized pump beams are represented by a coherent linear superposition of states:

$$\frac{1}{\sqrt{2}}(|V\rangle_{1p}+|V\rangle_{2p})$$

The Type I DCC 810 is a periodically poled crystal that converts the vertically polarized photon $|V\rangle_{1p}$ transmitted in the first transmission channel 824 into longer wavelength vertically polarized signal and idler photons as follows:

$$|V\rangle_{1p} \xrightarrow{Type\,I} |V\rangle_{1s}|V\rangle_{1i}$$

The Type I DCC 810 also converts the vertically polarized photon transmitted in the second transmission channel 826 $|V\rangle_{2p}$ into longer wavelength vertically polarized signal and idler photons as follows:

$$|V\rangle_{2p} \xrightarrow{Type\,I} |V\rangle_{2s}|V\rangle_{2i}$$

The HWP 804 receives the vertically polarized signal and idler photons $|V\rangle_{1s}|V\rangle_{1i}$ transmitted in the first transmission channel 824 and outputs horizontally polarized signal and idler photons $|H\rangle_{1s}|H\rangle_{1i}$. The length of the BD 808 is chosen so that it removes path dependence from the polarized signal and idler photons by both transmitting the horizontally polarized signal and idler photons $|H\rangle_{1s}|H\rangle_{1i}$ undisturbed and redirecting the vertically polarized photons $|V\rangle_{1s}|V\rangle_{1i}$ into a single output transmission channel 828. The state of the vertically and horizontally polarized signal and idler photons transmitted in the output transmission channel 828 is $|\phi\rangle$. The phase difference θ may be acquired as a result of different transmission channel lengths or small imperfections in the shape of the Type I DCC 810 and the BD 806 and 808 crystals. For example, the path length of the first transmission channel 824 may be slightly longer than the path length of the second transmission channel 828.

Dichroic mirror 812 is a birefringent mirror that is used to separate non-degenerate signal and idler photons according to wavelength. A dichroic mirror is a semi-transparent bandpass filter that reflects electromagnetic waves with wavelengths that are shorter than a threshold wavelength, $\lambda_t$, and transmits electromagnetic waves with wavelengths that are longer than the threshold wavelength. For example, as shown in FIG. 8, assuming that the "signal" label has been assigned to identify photons with shorter wavelengths than "idler" labeled photons, and that the dichroic mirror 812 has been fabricated with a threshold wavelength satisfying the condition:

$$\lambda_s < \lambda_t < \lambda_i$$

the dichroic mirror 812 reflects the signal photons in the polarization states $|H\rangle_s$ and $|V\rangle_s$ to the first fiber optic coupler 814 and transmits idler photons in the polarization states $|H\rangle_i$ and $|V\rangle_i$ to the second fiber optic coupler 816.

Figure 9:
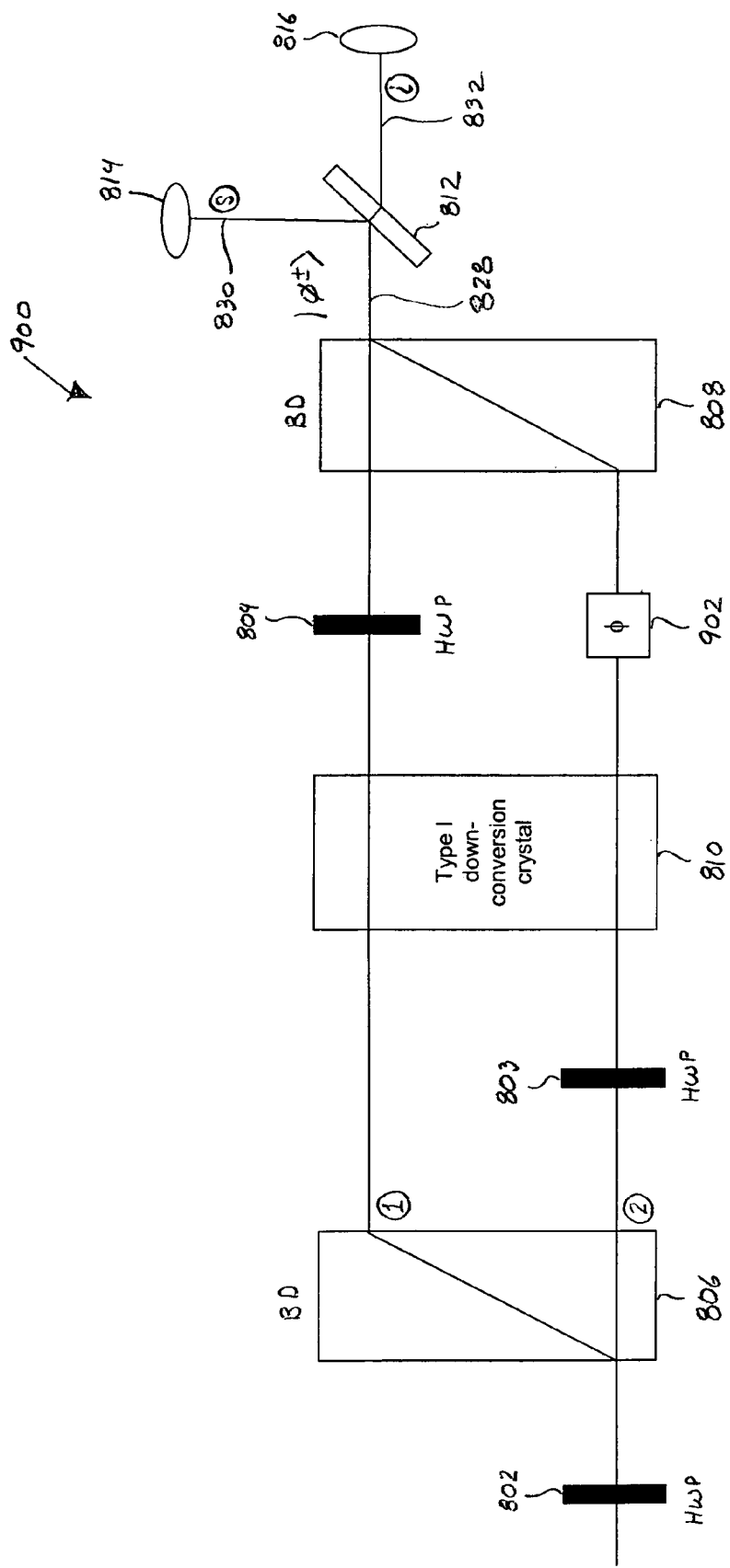
FIG. 9 illustrates a schematic plan view of the first non-degenerate polarization entangled-photon source shown in FIG. 8 that includes an optical device for removing a path-dependent phase difference that represents an embodiment of the present invention.

In an alternate embodiment of the present invention, the phase difference θ between the photons transmitted in the first and second transmission channels 824 and 826 can be adjusted by inserting an optical device into either the transmission channel 824 or the transmission channel 826. The optical device can be a thin piece of glass that is tilted to induce a delay in a propagating electromagnetic wave. FIG. 9 illustrates a schematic plan view of a first non-degenerate polarization entangled-photon source 900 that includes an optical device 902 for removing a path-dependent phase difference θ that represents an embodiment of the present invention. The entangled-photon source 900 is identical to the entangled-photons source 800, shown in FIG. 8, except for the optical device 902 inserted into the transmission channel 826. The optical device 902 can be fabricated, or tuned, to introduce into the second transmission channel 826 a phase adjustment that is mathematically represented by:

$$\hat{\Phi}=\exp[i(2\pi n-\theta)]$$

where
n=0, ±½, ±1, ±³⁄₂, ±2, ... is a phase adjustment parameter that can be determined when fabricating the optical device 902.

Operation of the optical device 902 in the transmission channel 826 can be mathematically represented by:

$$|\phi\rangle \xrightarrow{\hat{\Phi}} \frac{1}{\sqrt{2}}(|H\rangle_s|H\rangle_i + e^{i(2\pi n-\theta)}e^{i\theta}|V\rangle_s|V\rangle_i)$$

$$= \frac{1}{\sqrt{2}}(|H\rangle_s|H\rangle_i + e^{i2\pi n}|V\rangle_s|V\rangle_i)$$

$$= |\phi^{(n)}\rangle$$

When the optical device 902 is fabricated so that n is integral valued, the polarization entangled-photon state output to the fiber optic couplers 814 and 816 is the Bell state:

$$|\phi^+\rangle = \frac{1}{\sqrt{2}}(|H\rangle_s|H\rangle_i - |V\rangle_s|V\rangle_i)$$

When the optical device 902 is fabricated so that n is half-integral valued, the polarization-entangled photon state output to the fiber optic couplers 814 and 816 is the Bell state:

$$|\phi^-\rangle = \frac{1}{\sqrt{2}}(|H\rangle_s|H\rangle_i - |V\rangle_s|V\rangle_i)$$

Figure 10:
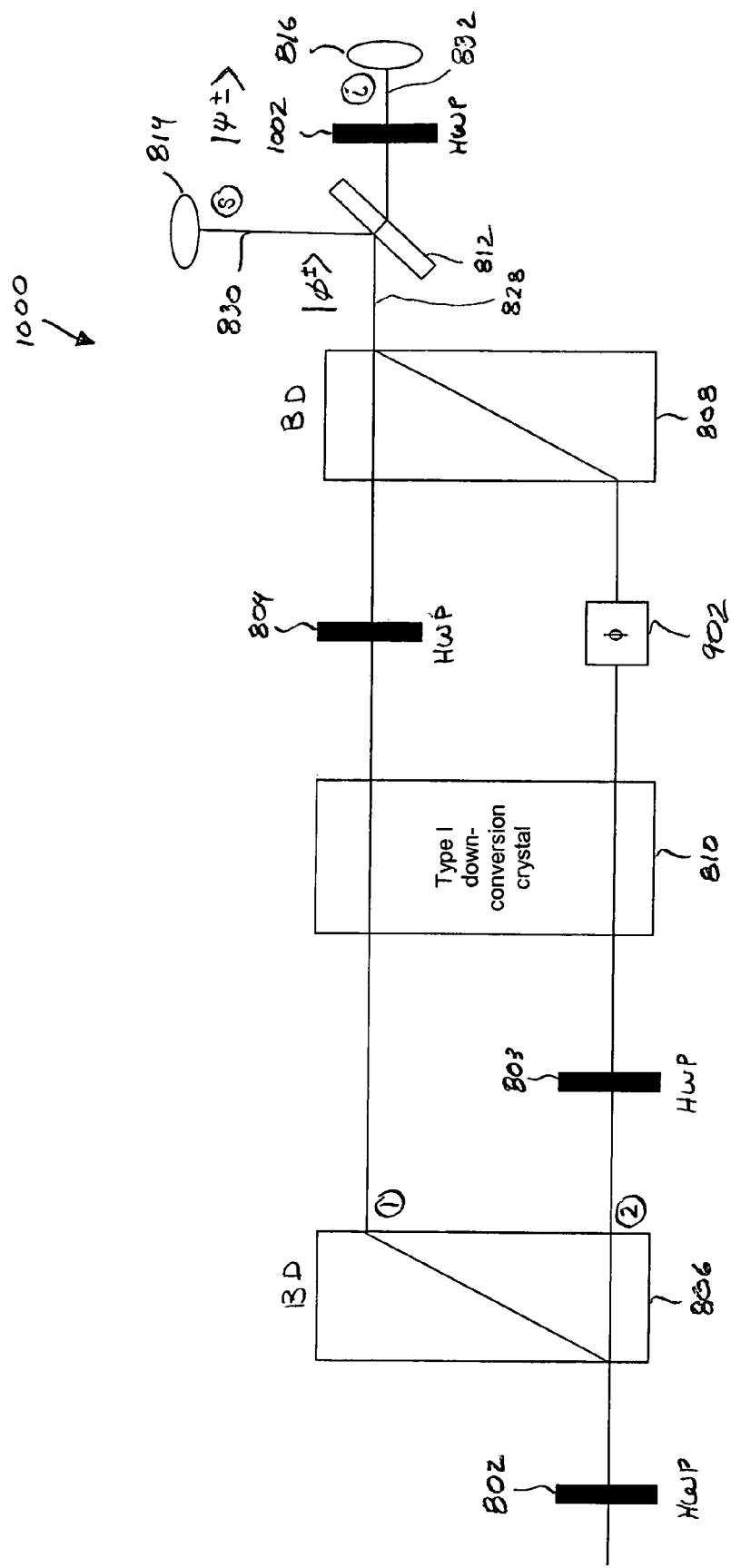
FIG. 10 illustrates a schematic plan view of the first non-degenerate polarization entangled-photon source shown in FIG. 9 that includes a half-wave plate in an idler beam transmission channel that represents an embodiment of the present invention.

In an alternate embodiment of the present invention, the polarization entangled-photon Bell states $|\psi^+\rangle$ and $|\psi^-\rangle$ can be generated by inserting a HWP into the idler beam transmission channel 832 of the entangled-photon source 900. FIG. 10 illustrates a schematic plan view of a first non-degenerate polarization entangled-photon source 1000 that includes a HWP 1002 in the idler beam transmission channel 832 of the entangled-photons source 900, shown in FIG. 9, that represents an embodiment of the present invention. When the optical device 902 is fabricated so that n is integral valued, the HWP 1002 operates on idler photons in the Bell state $|\phi^+\rangle$ to give polarization-entangled photons in the Bell state:

$$|\phi^+\rangle \xrightarrow{HWP} |\psi^+\rangle = \frac{1}{\sqrt{2}}(|H\rangle_s|V\rangle_i + |V\rangle_s|H\rangle_i)$$

When the optical device 902 is fabricated so that n is half-integral valued, the HWP 1002 operates on the idler photons in the Bell state $|\phi^-\rangle$ to give polarization-entangled photons in the Bell state:

$$|\phi^-\rangle \xrightarrow{HWP} |\psi^-\rangle = \frac{1}{\sqrt{2}}(|H\rangle_s|V\rangle_i - |V\rangle_s|H\rangle_i)$$

Figure 11:
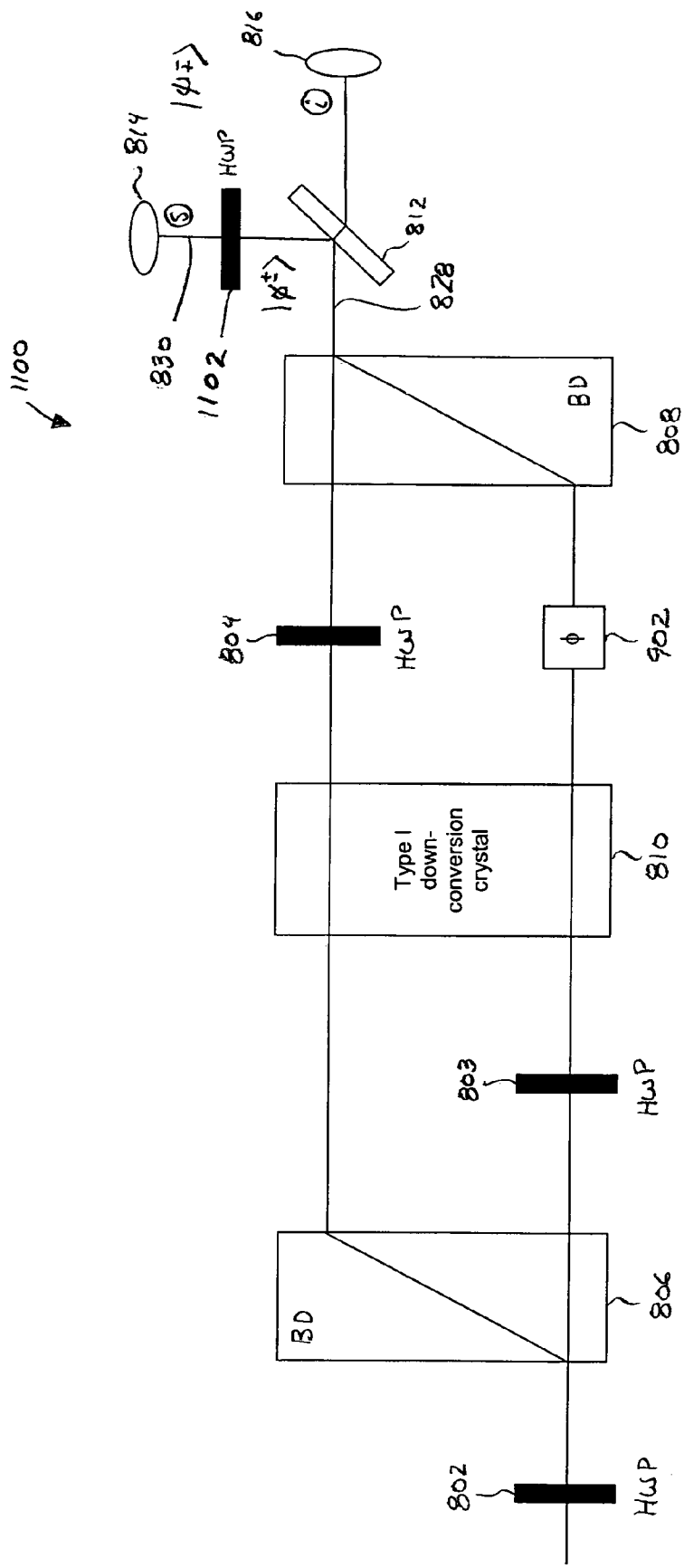
FIG. 11 illustrates a schematic plan view of the first non-degenerate polarization entangled-photon source shown in FIG. 9 that includes a half-wave plate in a signal beam transmission channel that represents an embodiment of the present invention.

In an alternate embodiment of the present invention, the entangled-photon polarization states $|\psi^+\rangle$ and $|\psi^-\rangle$ can also be generated by inserting a HWP into the signal beam transmission channel 830 of the entangled-photon source 900. FIG. 11 illustrates a schematic plan view of a first non-degenerate polarization entangled-photon source 1100 that includes a HWP 1202 in the signal beam transmission channel 830 of the entangled-photon source 900, shown in FIG. 9, that represents an embodiment of the present invention. When the optical device 902 is fabricated so that n is integral valued, the HWP 1002 operates on the signal photons in the Bell state $|\phi^+\rangle$ to give the polarization-entangled photons in the Bell state:

$$|\phi^+\rangle \xrightarrow{HWP} |\psi^+\rangle$$

When the optical device 902 is fabricated so that n is half-integral valued, the HWP 1002 operates on the signal photons in the Bell state $|\phi^-\rangle$ is:

$$|\phi^-\rangle \xrightarrow{HWP} \frac{1}{\sqrt{2}}(|V\rangle_s|H\rangle_i - |H\rangle_s|V\rangle_i) = -|\psi^-\rangle$$

Figure 12:
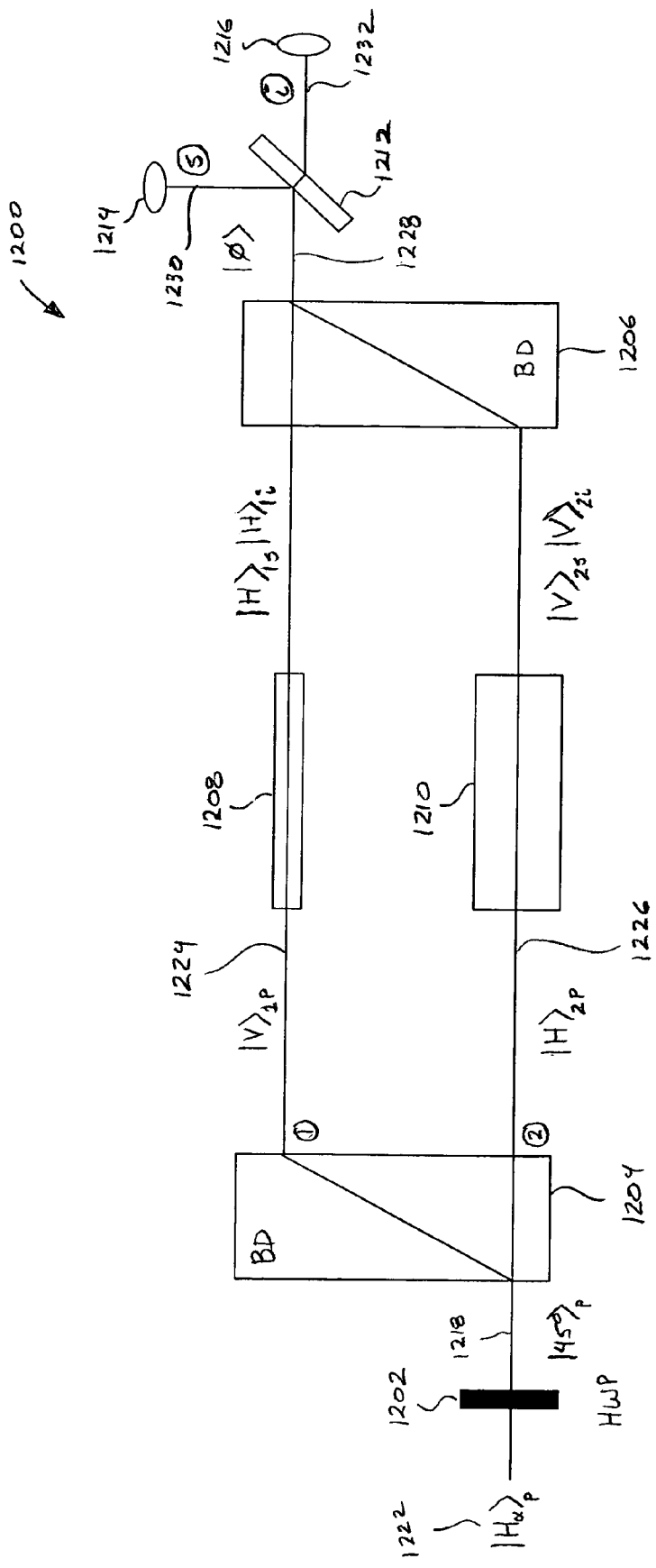
FIG. 12 illustrates a schematic plan view of a second non-degenerate polarization entangled-photon source that represents an embodiment of the present invention.

FIG. 12 illustrates a schematic plan view of a second non-degenerate polarization entangled-photon source 1200 that represents an embodiment of the present invention. The entangled-photon source 1200 comprises a HWP 1202, two BDs 1204 and 1206, a first Type I DCC 1208, a second Type I DCC 1210, a dichroic mirror 1212, first fiber optic coupler 1214, and a second fiber optic coupler 1216. Lines, such as line 1218, represent beam transmission channels. The entangled-photon source 1200 receives a horizontally polarized pump beam $|H_\alpha\rangle_p$ 1222 from a pump beam source (not shown), and outputs a polarization entangled-photon in the state $|\phi\rangle$, as described above with reference to FIG. 8. The dichroic mirror 1212 reflects shorter wavelength "signal" labeled photons to the first fiber optic coupler 1214 via a signal beam transmission channel 1230 and transmits longer wavelength "idler" labeled photons to the second fiber optic coupler 1216 via an idler beam transmission channel 1232. The fiber optic couplers 1214 and 1216 can be connected to a quantum computer, quantum information processor, a quantum-cryptographic device, quantum teleportation device, or other optical-based device or network.

The HWP 1202 receives the pump beam $|H_\alpha\rangle_p$ 1222 and outputs a pump beam in the polarization state $|45°\rangle$, as described above with reference to FIG. 8. The BD 1204 receives the pump beam in the polarization state $|45°\rangle$ and outputs a vertically polarized pump beam $|V\rangle_p$ along a first transmission channel 1224 and outputs the horizontally polarized pump beam $|H\rangle_p$ undisturbed along a second transmission channel 1226. The state of the polarized pumps can be represented by a transmission-path dependent, coherent linear superposition of states:

$$\frac{1}{\sqrt{2}}(|H\rangle_{2p} + |V\rangle_{1p})$$

where
the subscript "1" identifies the first transmission channel 1224; and
the subscript "2" identifies the second transmission channel 1226.

The first Type I DCC 1208 and the second Type I DCC 1210 are identical periodically poled crystals with parallel transmission channels 1224 and 1226, respectively. However, the second Type I DCC 1210 is rotated 90° from the orientation of the first Type I DCC 1208 about the second transmission channel 1226. The first Type I DCC 1208 is oriented so that the incident vertically polarized photon $|V\rangle_{1p}$ transmitted along the first transmission channel 1224 is converted into horizontally polarized signal and idler photons as follows:

$$|V\rangle_{1p} \xrightarrow{Type\,I} |H\rangle_{1s}|H\rangle_{1i},$$

The second Type I DCC 1210 is oriented so that the incident horizontally polarized photon $|H\rangle_{2p}$ transmitted along the second transmission channel 1226 is converted into vertically polarized signal and idler photons as follows:

$$|H\rangle_{2p} \xrightarrow{Type\,I} |V\rangle_{2s}|V\rangle_{2i}$$

The BD 1206 removes path dependence from the polarized signal and idler photons output from the Type I DCCs 1208 and 1210 by both transmitting the horizontally polarized signal and idler photons $|H\rangle_{1s}|H\rangle_{1i}$ undisturbed and directing the vertically polarized photons $|V\rangle_{1s}|V\rangle_{1i}$ into a single transmission channel 1228. The state of the vertically and horizontally polarized signal and idler photons transmitted in a single output transmission channel 1228 is $|\phi\rangle$.

The dichroic mirror 1212 separates the non-degenerate signal and idler photons according to wavelength, as described above with reference to FIG. 8. As shown in FIG. 12, the dichroic mirror 812 reflects the signal photons to the first fiber optic coupler 1214 and transmits idler photons to the second fiber optic coupler 1216.

Figure 13:
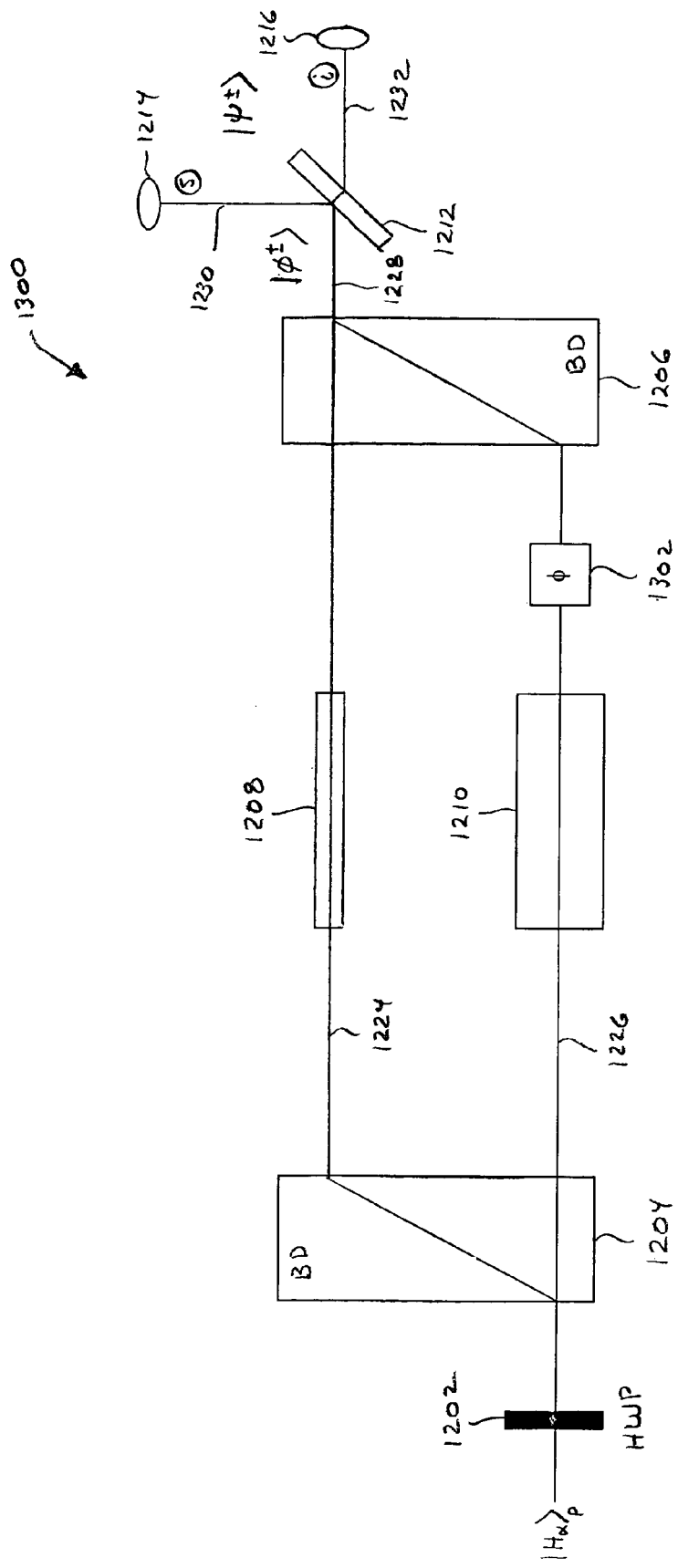
FIG. 13 illustrates a schematic plan view of the second non-degenerate polarization entangled-photon source shown in FIG. 12 that includes an optical device for removing a path-dependent phase difference that represents an embodiment of the present invention.

In an alternate embodiment of the present invention, the phase difference θ between the horizontally and vertically polarized photons emitted by the BD 1206 can be adjusted by inserting an optical device into either the transmission channel 1224 or the transmission channel 1226, as described above with reference to FIG. 9. FIG. 13 illustrates a schematic plan view of a second non-degenerate polarization entangled-photon source 1300 that includes an optical device 1302 for removing a path-dependent phase difference θ that represents an embodiment of the present invention. The entangled-photon source 1300 is identical to the entangled-photon source 1200, shown in FIG. 12, except the optical device 1302 inserted into the transmission channel 1226. The optical device 1302 can be fabricated, or tuned, to introduce a phase adjustment so that polarization entangled-photons in the output transmission channel 1228 are in the state $|\phi^{(n)}\rangle$, as described above with reference to FIG. 9. When the optical device 1302 is fabricated so that n is integral valued, the polarization-entangled photons are in the Bell state $|\phi^+\rangle$, and when the optical device 1302 is fabricated so that n is half-integral valued, the polarization-entangled photons are in the Bell state $|\phi^-\rangle$.

Figure 14:
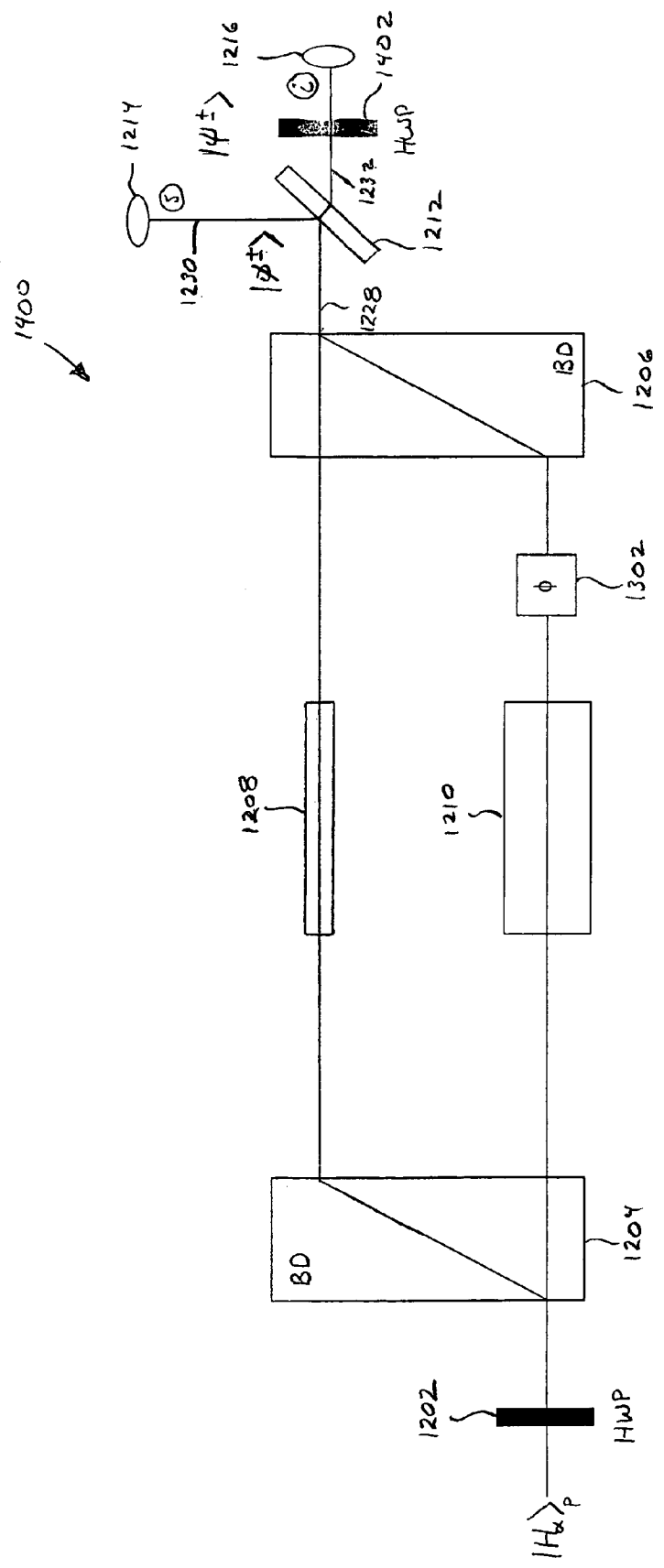
FIG. 14 illustrates a schematic plan view of the second non-degenerate polarization entangled-photon source shown in FIG. 13 that includes a half-wave plate in an idler beam transmission channel that represents an embodiment of the present invention.

In an alternate embodiment of the present invention, the polarization-entangled photons in the Bell states $|\psi^+\rangle$ and $|\psi^-\rangle$ can be generated by inserting a HWP into the idler beam transmission channel 1232 of the entangled-photon source 1300. FIG. 14 illustrates a schematic plan view of a second non-degenerate polarization entangled-photon source 1400 that includes a HWP 1402 in the idler beam transmission channel 1332 of the entangled-photons source 1300, shown in FIG. 13, that represents an embodiment of the present invention. When the optical device 1302 is fabricated so that n is integral valued, the HWP 1402 operates on the idler beam photons in the Bell state $|\phi^+\rangle$ to produce polarization-entangled photons in the Bell state $|\psi^+\rangle$, and when the optical device 1302 is fabricated so that n is half-integral valued, the HWP 1402 operates on the idler beam photons in the Bell state $|\phi^-\rangle$ to produce polarization entangled-photons in the Bell state $|\psi^-\rangle$.

Figure 15:
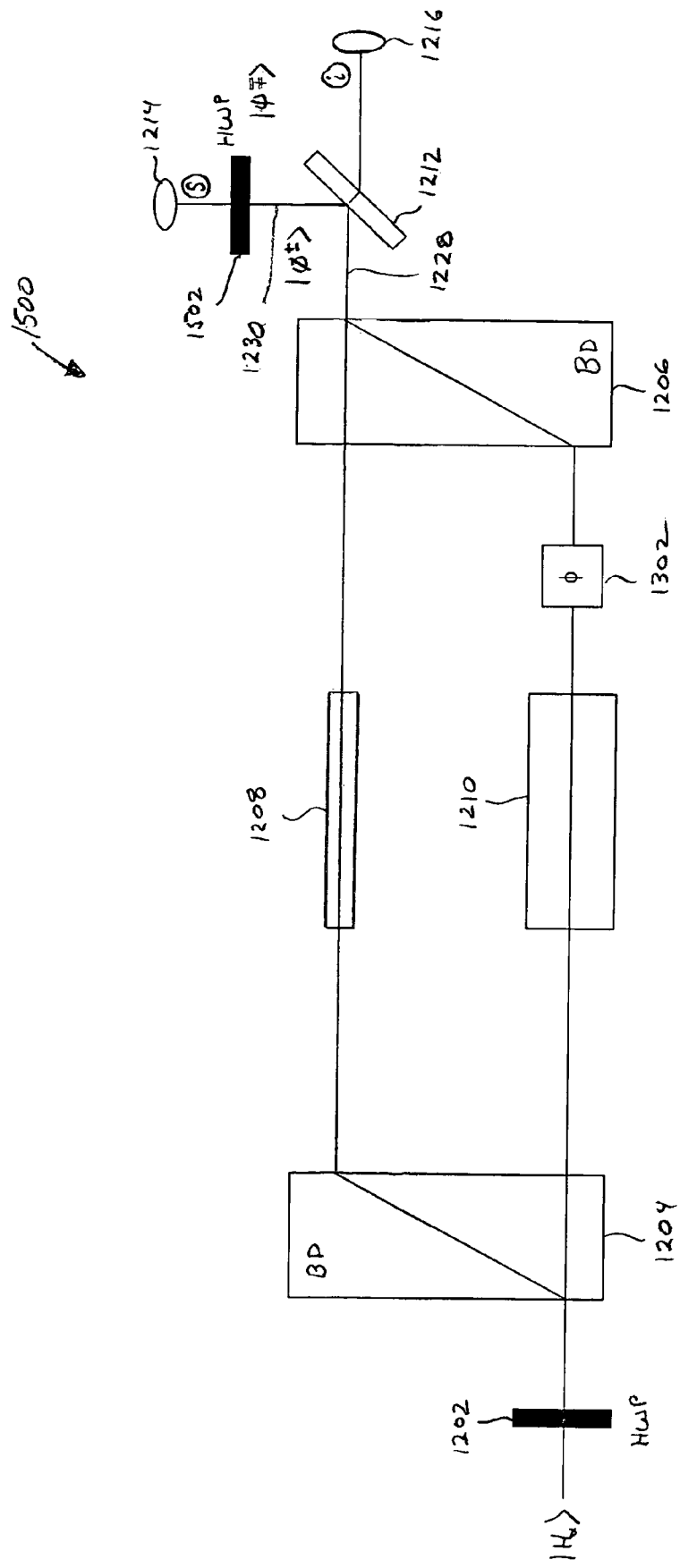
FIG. 15 illustrates a schematic plan view of the second non-degenerate polarization entangled-photon source shown in FIG. 13 that includes a half-wave plate in a signal beam transmission channel that represents an embodiment of the present invention.

In an alternate embodiment of the present invention, the entangled-photon polarization states $|\psi^+\rangle$ and $|\psi^-\rangle$ can also be generated by inserting a HWP into the signal beam transmission channel 1230 of the entangled-photon source 1300. FIG. 15 illustrates a schematic plan view of a second non-degenerate polarization entangled-photon source 1500 that includes a HWP 1502 in the signal beam transmission channel 1230 of the entangled-photon source 1300, shown in FIG. 13, that represents an embodiment of the present invention. When the optical device 1302 is fabricated so that n is integral valued, the HWP 1502 operates on the idler beam photons in the Bell state $|\phi^+\rangle$ to produce polarization-entangled photons in the Bell state $|\psi^+\rangle$, and when the optical device 1302 is fabricated so that n is half-integral valued, the HWP 1502 operates on the idler beam photons in the Bell state $|\phi^-\rangle$ to produce polarization entangled-photons in the Bell state $-|\psi^-\rangle$.

Figure 16:
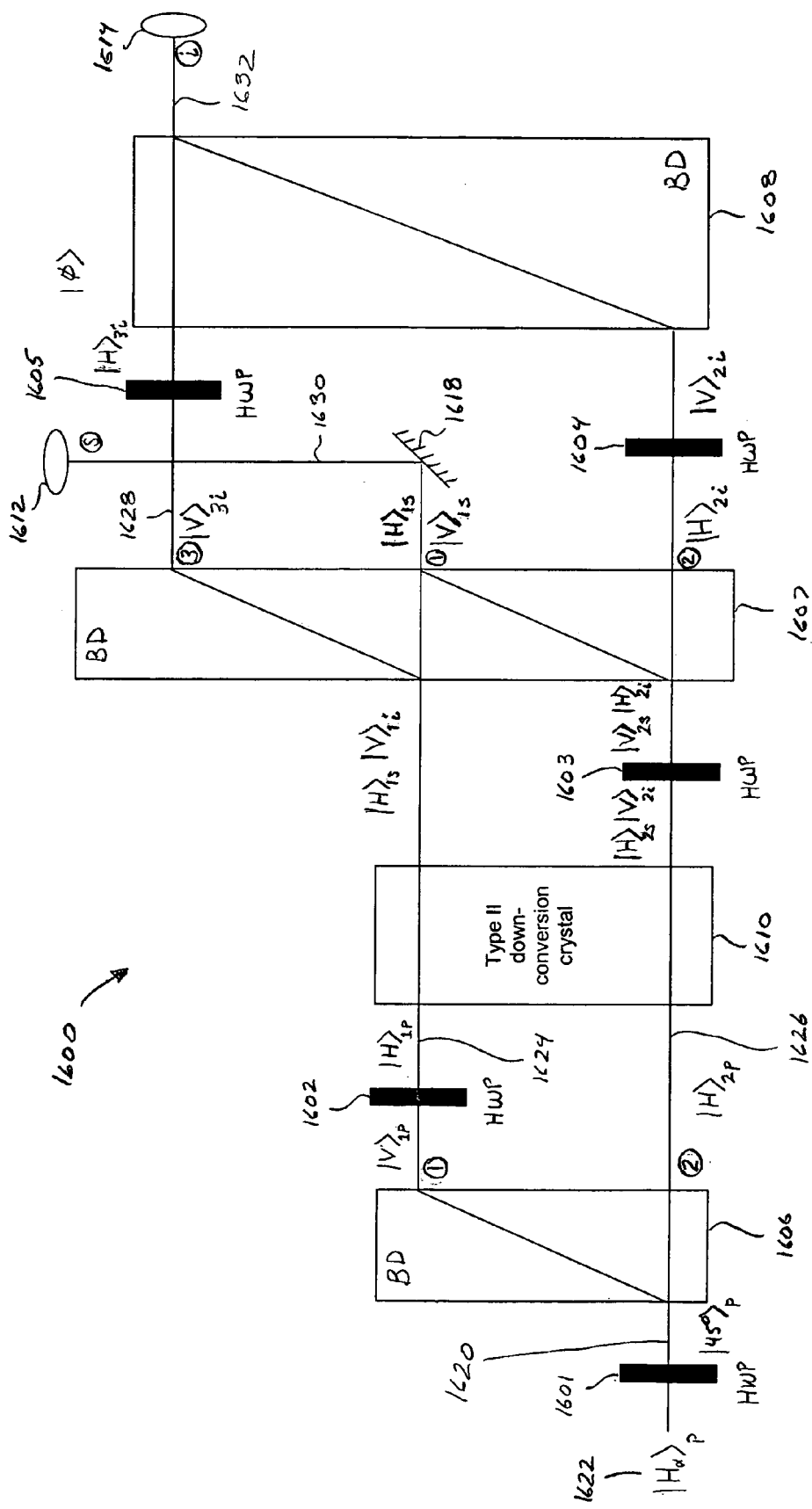
FIG. 16 illustrates a schematic plan view of a first degenerate polarization entangled-photon source that represents an embodiment of the present invention.

FIG. 16 illustrates a schematic plan view of a first degenerate polarization entangled-photon source 1600 that represents an embodiment of the present invention. The entangled-photon source 1600 comprises five HWPs 1601-1605, three BDs 1606-1608, a Type II DCC 1610, a first fiber optic coupler 1612, a second fiber optic coupler 1614, and a mirror 1618. Lines, such as line 1620, represent beam transmission channels in free space. The entangled-photon source 1600 receives a horizontally polarized pump beam $|H_\alpha\rangle_p$ 1622 from a pump beam source (not shown) and outputs polarization entangled-photons to the fiber optic couplers 1612 and 1614 in the state $|\phi\rangle$, as described above with reference to FIG. 8. The fiber optic couplers 1612 and 1614 can be connected to a quantum computer, quantum information processor, a quantum-cryptographic device, quantum teleportation device or other optical-based device or network.

The HWP 1601 receives the pump beam $|H_\alpha\rangle_p$ 1622 and outputs a 45° polarized pump beam $|45°\rangle$, as described above with reference to FIG. 8. The BD 1606 receives the polarized pump beam $|45°\rangle$ and outputs horizontally and vertically polarized photons represented by a coherent linear superposition of states:

$$\frac{1}{\sqrt{2}}(|H\rangle_{2p}+|V\rangle_{1p})$$

where the subscript "1" identifies the first transmission channel 1624; and the subscript "2" identifies the second transmission channel 1626.

The HWP 1602 receives the vertically polarized pump beam $|V\rangle_{1p}$ transmitted along the first transmission channel 1624 and outputs a horizontally polarized pump beam $|H\rangle_{1p}$ in order to obtain polarized pump beams in a coherent linear superposition of states:

$$\frac{1}{\sqrt{2}}(|H\rangle_{1p}+|H\rangle_{2p})$$

The Type II DCC 1610 is a periodically poled crystal that converts both of the horizontally polarized pump beams $|H\rangle_{1p}$ and $|H\rangle_{2p}$ into longer wavelength horizontally polarized signal photons and vertically polarized idler photons as follows:

$$|H\rangle_{1p} \xrightarrow{Type\, II} |H\rangle_{1s}|V\rangle_{1i}, \text{ and } |H\rangle_{2p} \xrightarrow{Type\, II} |H\rangle_{2s}|V\rangle_{2i}$$

The Type II DCC 1610 produces degenerate, or identical, wavelength signal and idler photons.

The HWP 1603 receives the horizontally and vertically polarized signal and idler photons in the state $|H\rangle_{2s}|V\rangle_{2i}$ and outputs vertically polarized signal, and horizontally polarized idler, photons in the state $|V\rangle_{2s}|H\rangle_{2i}$.

The BD 1607 transmits the horizontally polarized signal and idler photons $|H\rangle_{1s}$ and $|H\rangle_{2i}$ undisturbed in the transmission channels 1624 and 1626, respectively. However, the BD 1607 redirects the vertically polarized signal photon $|V\rangle_{2s}$ from the second transmission channel 1626 into the first transmission channel 1624, which is represented by the state $|V\rangle_{1s}$, and redirects the vertically polarized idler photon $|V\rangle_{1i}$ from the first transmission channel 1624 into the third transmission channel 1628, which is represented by the state $|V\rangle_{3i}$.

The mirror 1618 redirects the horizontally and vertically polarized signal photons $|H\rangle_{1i}$ and $|V\rangle_{1s}$ transmitted in the transmission channel 1624 to the first fiber optic coupler 1612 via the signal beam transmission channel 1630.

The HWP 1604 changes the polarization state of the horizontally polarized idler photon $|H\rangle_{2i}$ into a vertically polarized idler photon $|V\rangle_{2i}$, and the HWP 1605 changes the polarization state of the vertically polarized idler photon $|V\rangle_{3i}$ into a horizontally polarized idler photon $|H\rangle_{3i}$. The BD 1608 transmits the horizontally polarized idler photon $|H\rangle_{3i}$ undisturbed in the third transmission channel 1628, and redirects the vertically polarized idler photon $|V\rangle_{2i}$, to the idler beam transmission channel 1632. The horizontally polarized idler photon $|H\rangle_{3i}$ and the vertically polarized idler photon $|V\rangle_{2i}$ are transmitted to the second fiber optical coupler 1614 via an idler beam transmission channel 1632.

Because both the vertically and horizontally polarized signal photons are transmitted in the signal beam transmission channel 1630, and both the vertically and horizontally polarized idler photons are transmitted in the idler beam transmission channel 1632, the numerical subscripts identifying transmission channels can be dropped and the state of the entangled vertically and horizontally polarized signal and idler photons before reaching the fiber optic couplers 1612 and 1614 can be represented by:

$$|\phi\rangle = \frac{1}{\sqrt{2}}(|H\rangle_s|H\rangle_i + e^{i\theta}|V\rangle_s|V\rangle_i)$$

where $|H\rangle_s$ and $|V\rangle_s$ are transmitted along the signal beam transmission channel 1630 to the first fiber optic coupler 1612;

$|H\rangle_i$ and $|V\rangle_i$ are transmitted along the idler beam transmission channel 1632 to the second fiber optic coupler 1614; and $\theta$ is a path-dependent, relative phase difference.

The phase difference $\theta$ can be acquired as described above with reference to FIG. 8.

Figure 17:
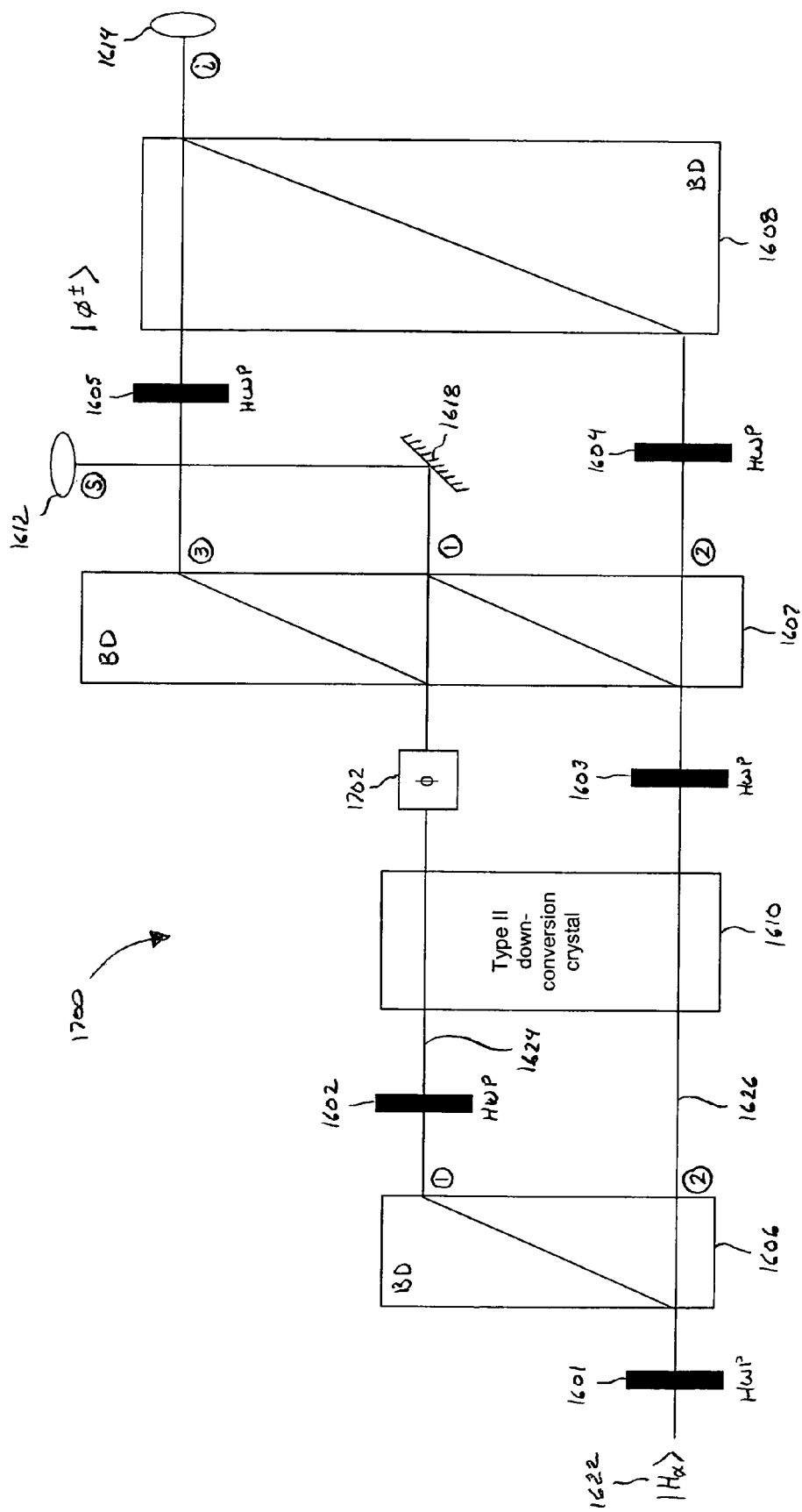
FIG. 17 illustrates a schematic plan view of the first degenerate polarization entangled-photon source shown in FIG. 16 that includes an optical device for removing a path-dependent phase difference that represents an embodiment of the present invention.

In an alternate embodiment of the present invention, the phase difference $\theta$ can be adjusted by inserting an optical device into one of the transmission channels. FIG. 17 illustrates a schematic plan view of a second degenerate polarization entangled-photon source 1700 that includes an optical device 1702 for removing a path-dependent phase difference $\theta$ that represents an embodiment of the present invention. The entangled-photon source 1700 is identical to the entangled-photon source 1600, shown in FIG. 16, except for the optical device 1702 inserted into the first transmission channel 1624. The optical device 1702 can be fabricated, or tuned, to introduce a phase adjustment into the first transmission channel 1624, as described above with reference to FIG. 9. As a result, the polarization entangled-photon state output to the fiber optic couplers 1612 and 1614 is $|\phi^{(n)}\rangle$. When the optical device 1702 is fabricated so that the phase adjustment parameter n is integral valued, the polarization-entangled photons output to the fiber optic couplers 1612 and 1614 are in the Bell state $|\phi^+\rangle$, and when the optical device 1702 is fabricated so that the phase adjustment parameter n is half-integral valued, the polarization-entangled photons output to the fiber optic couplers 1612 and 1614 are in the Bell state $|\phi^-\rangle$.

Figure 18:
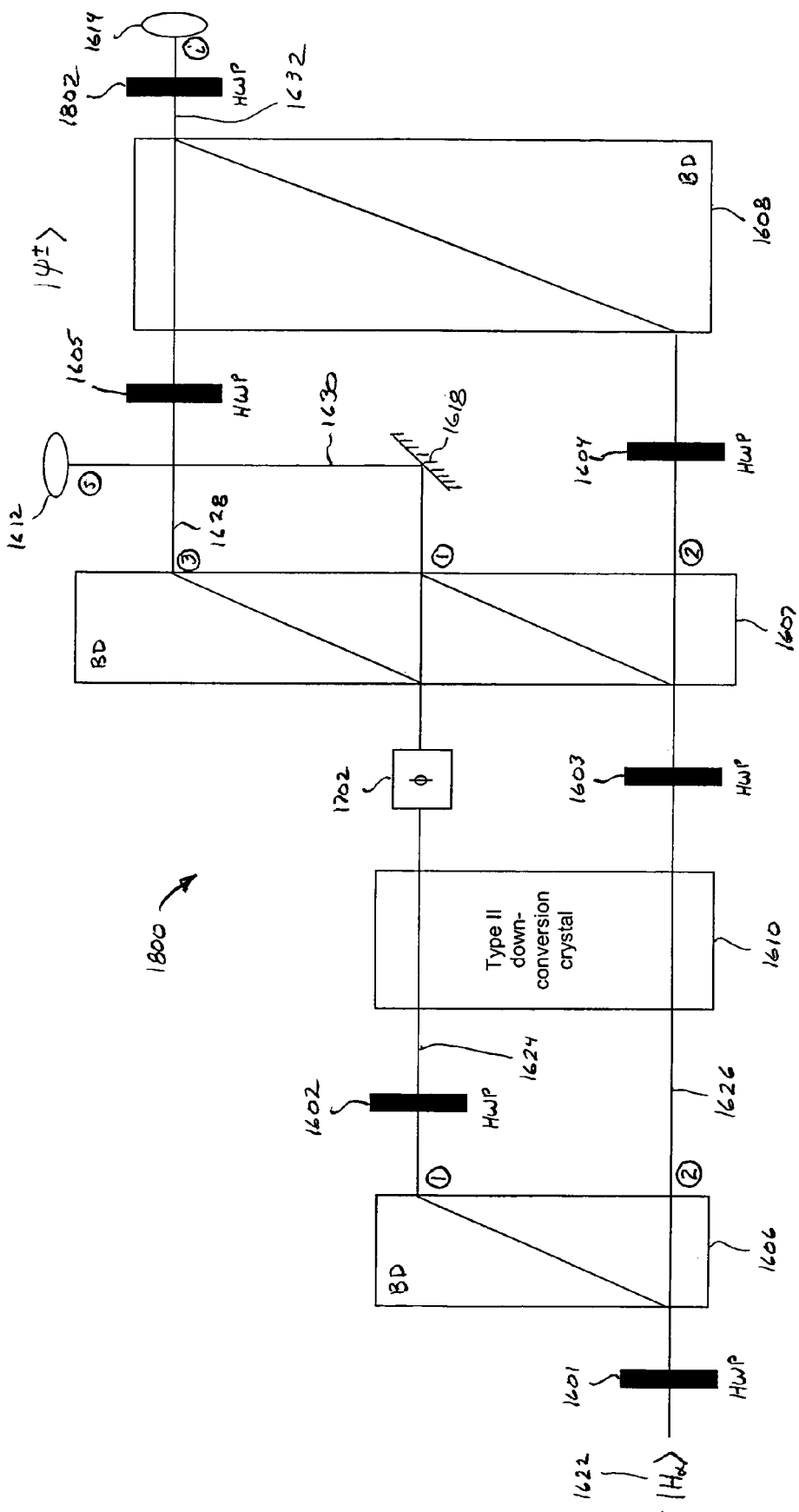
FIG. 18 illustrates a schematic plan view of the first degenerate polarization entangled-photon source shown in FIG. 17 that includes a half-wave plate in an idler beam transmission channel that represents an embodiment of the present invention.

In an alternate embodiment of the present invention, the polarization entangled-photon Bell states $|\psi^+\rangle$ and $|\psi^-\rangle$ can be generated by inserting a HWP into the idler beam transmission channel 1632 of the entangled-photon source 1700. FIG. 18 illustrates a schematic plan view of a second degenerate polarization entangled-photon source 1800 that includes a HWP 1802 in the idler beam transmission channel 1632 of the entangled-photons source 1700, shown in FIG. 17, that represents an embodiment of the present invention. When the optical device 1702 is fabricated so that n is integral valued, the HWP 1802 operates on the idler beam photons in the Bell state $|\phi^+\rangle$ to produce polarization-entangled photons in the Bell state $|\psi^+\rangle$, and when the optical device 1702 is fabricated so that n is half-integral valued, the HWP 1802 operates on the idler beam photons in the Bell state $|\phi^-\rangle$ to produce polarization entangled-photons in the Bell state $|\psi^-\rangle$.

In an alternate embodiment of the present invention, the entangled-photon polarization states $|\psi^+\rangle$ and $|\psi^-\rangle$ can also be generated by inserting a HWP into a signal beam output transmission channel of the entangled-photon source 1700.

Figure 19:
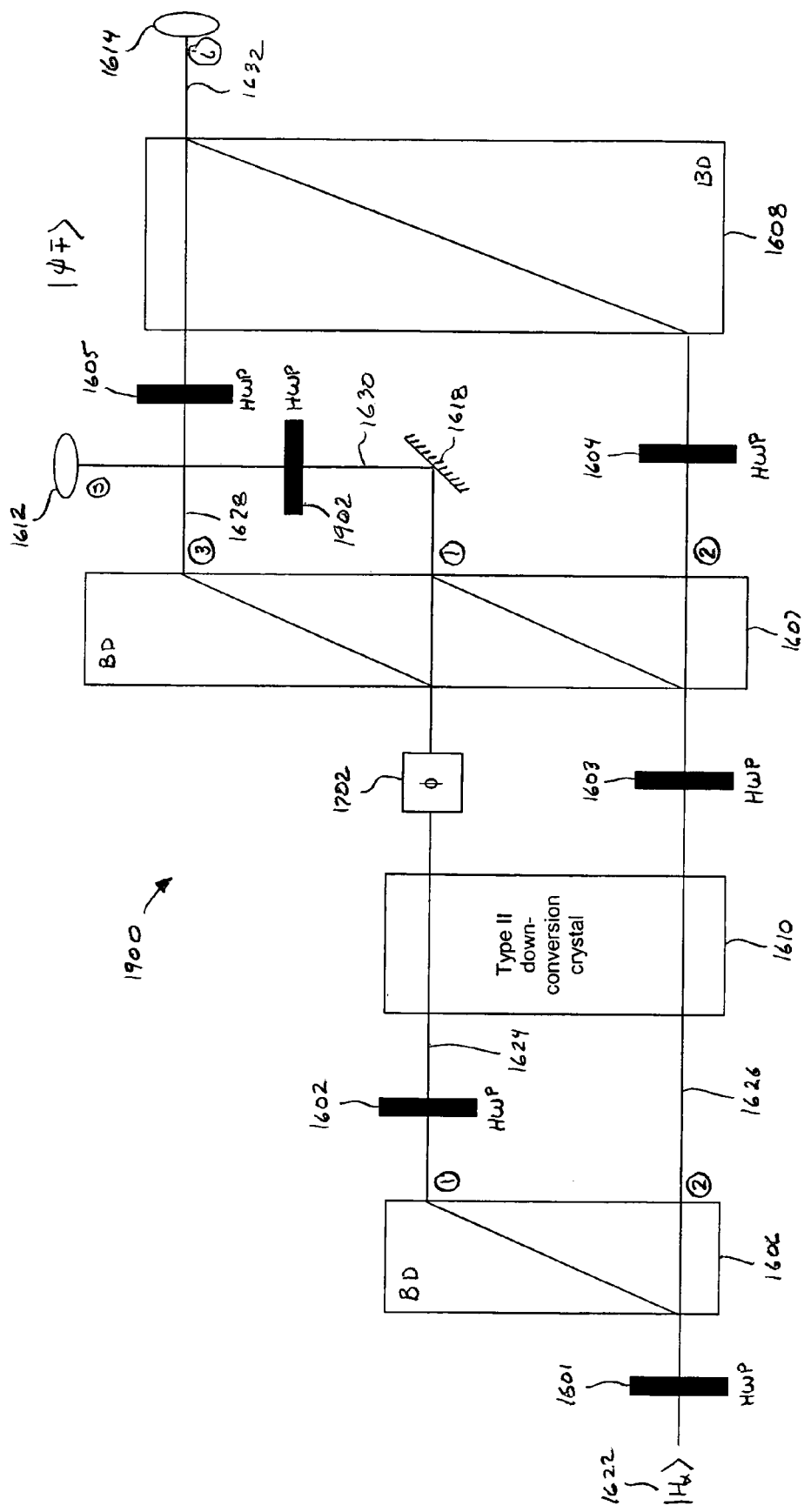
FIG. 19 illustrates a schematic plan view of the first degenerate polarization entangled-photon source shown in FIG. 17 that includes a half-wave plate in a signal beam transmission channel that represents an embodiment of the present invention.

FIG. 19 illustrates a schematic plan view of a second degenerate polarization entangled-photon source 1900 that includes a HWP 1902 in the signal beam transmission channel 1630 of the entangled-photon source 1700, shown in FIG. 17, that represents an embodiment of the present invention. When the optical device 1702 is fabricated so that n is integral valued, the HWP 1902 operates on the signal beam photons in the Bell state $|\phi^+\rangle$ to produce polarization-entangled photons in the Bell state $|\psi^+\rangle$, and when the optical device 1702 is fabricated so that n is half-integral valued, the HWP 1902 operates on the signal beam photons in the Bell state $|\phi^-\rangle$ to produce polarization entangled-photons in the Bell state $-|\psi^-\rangle$.

Figure 20:
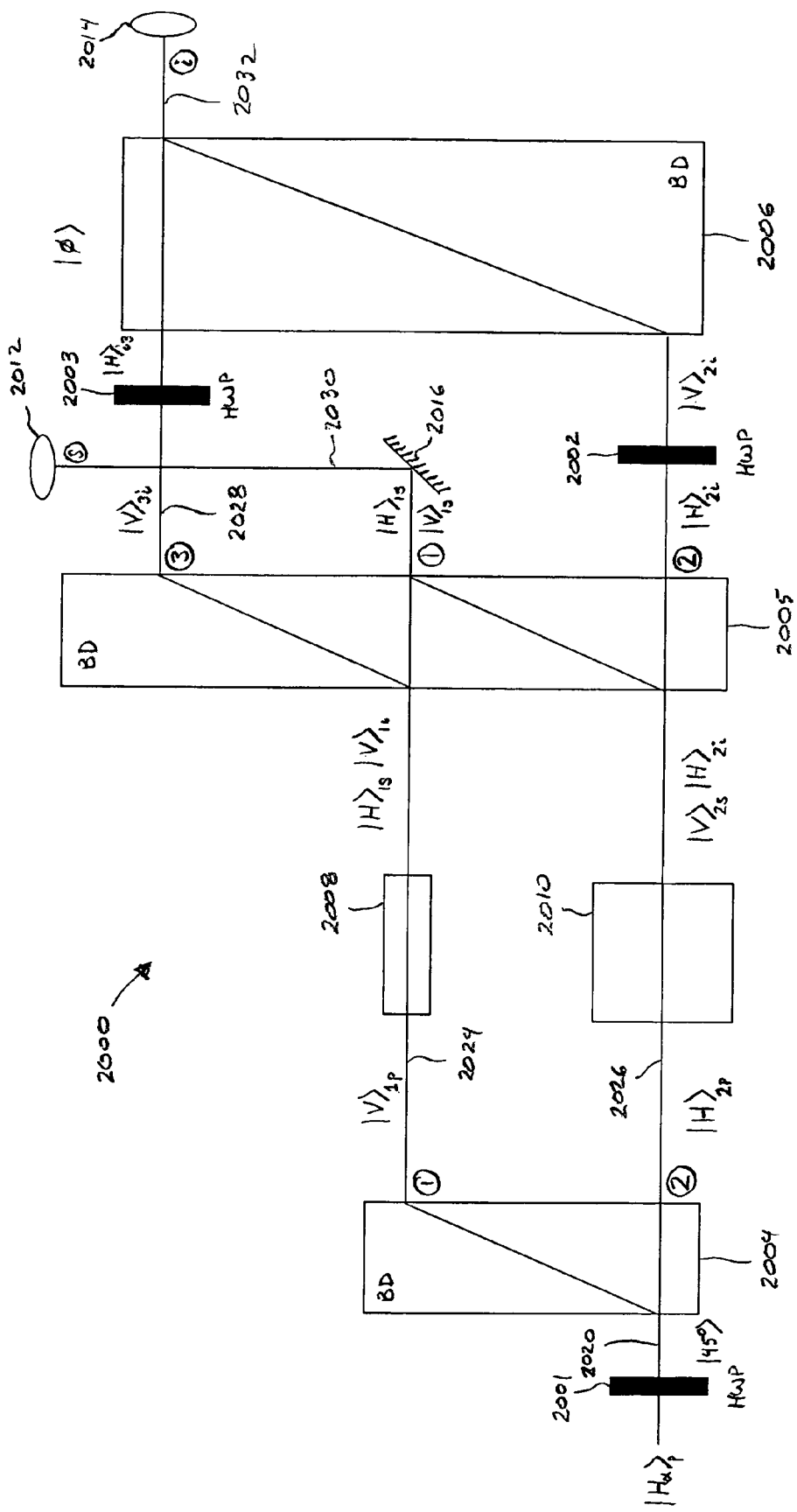
FIG. 20 illustrates a schematic plan view of a second degenerate polarization entangled-photon source that represents an embodiment of the present invention.

FIG. 20 illustrates a schematic plan view of a second degenerate polarization entangled-photon source 2000 that represents an embodiment of the present invention. The entangled-photon source 2000 comprises three HWPs 2001-2003, three BDs 2004-2006, a first Type II DCC 2008, a second Type II DCC 2010, a first fiber optic coupler 2012, a second fiber optic coupler 2014, and a mirror 2016. Lines, such as line 2020, represent beam transmission channels in free space. The entangled-photon source 2000 receives a horizontally polarized pump beam $|H_\alpha\rangle_p$ 2022 from a pump beam source (not shown) and outputs polarization entangled-photons to the fiber optic couplers 2012 and 2014 in the state $|\phi\rangle$. The pump beam $|H_\alpha\rangle_p$ 2022 can be a continuous electromagnetic wave or an electromagnetic wave pulse. The fiber optic couplers 2012 and 2014 can be connected to a quantum computer, quantum information processor, a quantum-cryptographic device, quantum teleportation device or other optical-based device or network.

The HWP 2001 receives the pump beam $|H_\alpha\rangle_p$ 2022 and outputs a 45° polarized pump beam $|45°\rangle$, as described above with reference to FIG. 8. The BD 2004 receives the polarized pump beam $|45°\rangle$ and outputs path-dependent vertically and horizontally polarized pump beams represented by a coherent linear superposition of states:

$$\frac{1}{\sqrt{2}}(|H\rangle_{2p} + |V\rangle_{1p})$$

where the subscript "1" identifies the first transmission channel 2024; and the subscript "2" identifies the second transmission channel 2026.

The vertically polarized pump beam $|V\rangle_{1p}$ is transmitted to the first Type II DCC 2008, and the horizontally polarized pump beam $|H\rangle_{2p}$ is transmitted to the second Type II DCC 2010. The first Type II DCC 2008 and the second Type II DCC 2010 are identical periodically poled crystals with parallel transmission channels 2024 and 2026, respectively. However, the second Type II DCC 2010 is rotated 90° from the orientation of the first Type II DCC 2008 about the second transmission channel 2026. The first Type II DCC 2008 is oriented so that the incident vertically polarized pump beam $|V\rangle_{1p}$ is converted into a horizontally polarized signal photon and vertically polarized idler photon as follows:

$$|V\rangle_{1p} \xrightarrow{Type\ II} |H\rangle_{1s}|V\rangle_{1i},$$

The second Type II DCC 2010 is oriented so that the incident horizontally polarized pump beam $|H\rangle_{2p}$ is converted into a vertically polarized signal photon and a horizontally polarized idler photon as follows:

$$|H\rangle_{2p} \xrightarrow{Type\ II} |V\rangle_{2s}|H\rangle_{2i}$$

The first and second Type II DCCs 2008 and 2010 both generate signal and idler photons with degenerate, or identical, wavelengths.

The BD 2005 transmits the horizontally polarized signal and idler photons $|H\rangle_{1s}$ and $|H\rangle_{2i}$ undisturbed along the transmission channels 2024 and 2026, respectively. The BD 2005 redirects the vertically polarized signal photon $|V\rangle_{2s}$ from the second transmission channel 2026 into the first transmission channel 2024, which is represented by the state $|V\rangle_{1s}$, and redirects the vertically polarized idler photon $|V\rangle_{1i}$ from the first transmission channel 2024 into a third transmission channel 2028, which is represented by the state $|V\rangle_{3i}$.

The mirror 2018 redirects the horizontally and vertically polarized signal photons $|H\rangle_{2i}$ and $|V\rangle_{1s}$ transmitted along the first transmission channel 2024 to the first fiber optic coupler 2012 via a signal beam transmission channel 2030.

The HWP 2002 changes the polarization state of the horizontally polarized idler photon $|H\rangle_{2i}$ into a vertically polarized idler photon $|V\rangle_{2i}$, and the HWP 2003 changes the polarization state of the vertically polarized idler photon $|V\rangle_{3i}$ into a horizontally polarized idler photon $|H\rangle_{3i}$. The BD 2006 transmits the horizontally polarized idler photon $|H\rangle_{3i}$ undisturbed in the third transmission channel 2028, and redirects the vertically polarized idler photon $|V\rangle_{2i}$, to the idler beam transmission channel 1632. The horizontally polarized idler photon $|H\rangle_{3i}$ and the vertically polarized idler photon $|V\rangle_{2i}$ are transmitted to the second fiber optical coupler 2014 via an idler beam transmission channel 2032.

Because both the vertically and horizontally polarized signal photons are transmitted on the signal beam transmission channel 2030 and both the vertically and horizontally polarized idler photons are transmitted on the idler transmission channel 2032 the numerical subscripts identifying transmission channels can be dropped and the state of the vertically and horizontally polarized signal and idler photons before reaching the fiber optic couplers 1612 and 1614 are in the state $|\phi\rangle$. The phase difference $\theta$ included in the state $|\theta\rangle$ can be acquired as described above with reference to FIG. 8.

Figure 21:
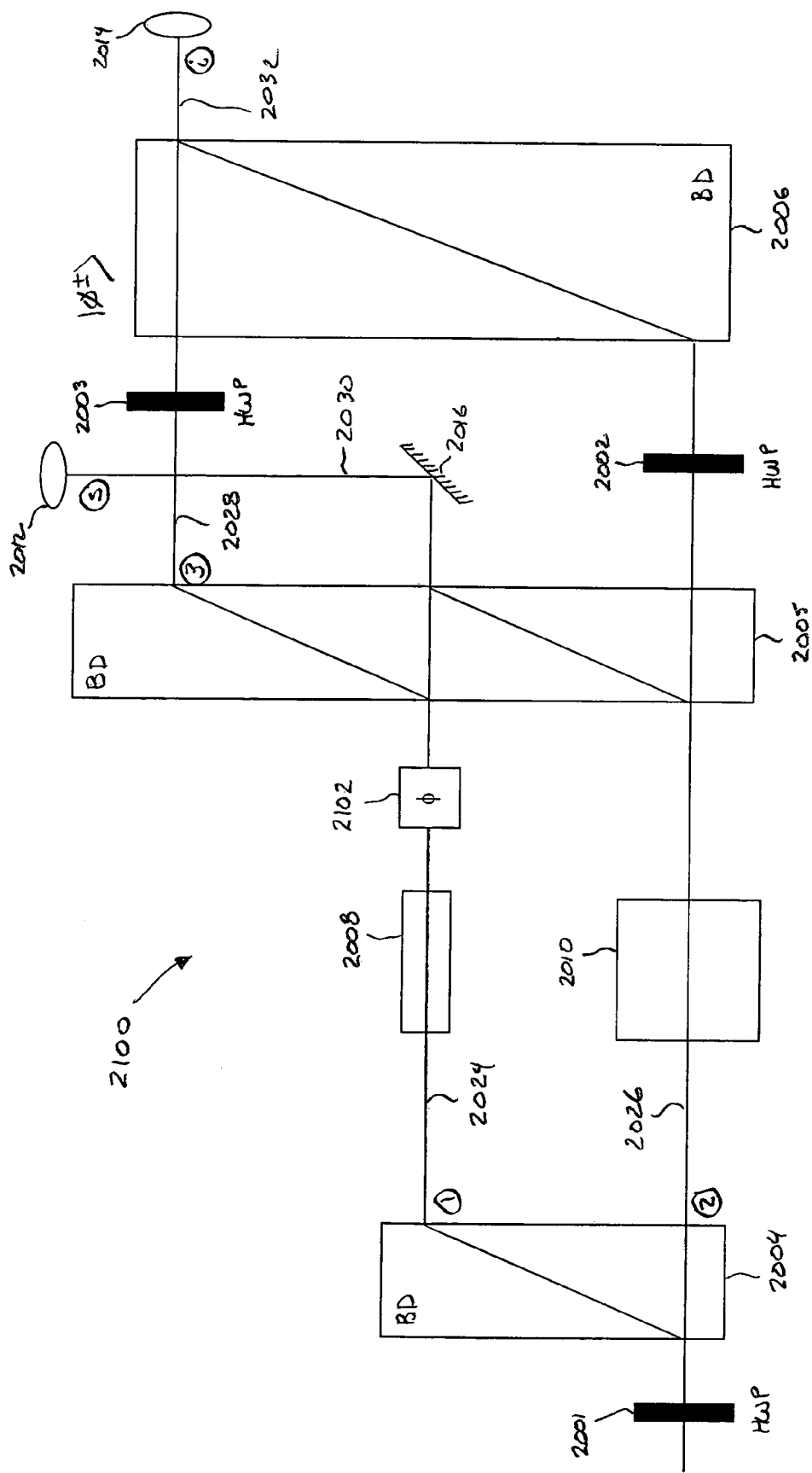
FIG. 21 illustrates a schematic plan view of the second degenerate polarization entangled-photon source shown in FIG. 20 that includes an optical device for removing a path-dependent phase difference that represents an embodiment of the present invention.

In an alternate embodiment of the present invention, the phase difference $\theta$ can be adjusted by inserting an optical device into one of the transmission channels. FIG. 21 illustrates a schematic plan view of a second degenerate polarization entangled-photon source 2100 that includes an optical device 2102 for removing a path-dependent phase difference $\theta$ that represents an embodiment of the present invention. The entangled-photon source 2100 is identical to the entangled-photon source 2000, shown in FIG. 16, except for the optical device 2102 inserted into the first transmission channel 2024. The polarization entangled-photon state output to the fiber optic couplers 1612 and 1614 is $|\phi^{(n)}\rangle$, as described above with reference to FIG. 9. When the optical device 2102 is fabricated so that the phase adjustment parameter n is integral valued, the polarization-entangled photons output to the fiber optic couplers 2012 and 2014 are in the Bell state $|\phi^+\rangle$, and when the optical device 2102 is fabricated so that the phase adjustment parameter n is half-integral valued, the polarization-entangled photons output to the fiber optic couplers 2012 and 2014 are in the Bell $|\phi^-\rangle$.

Figure 22:
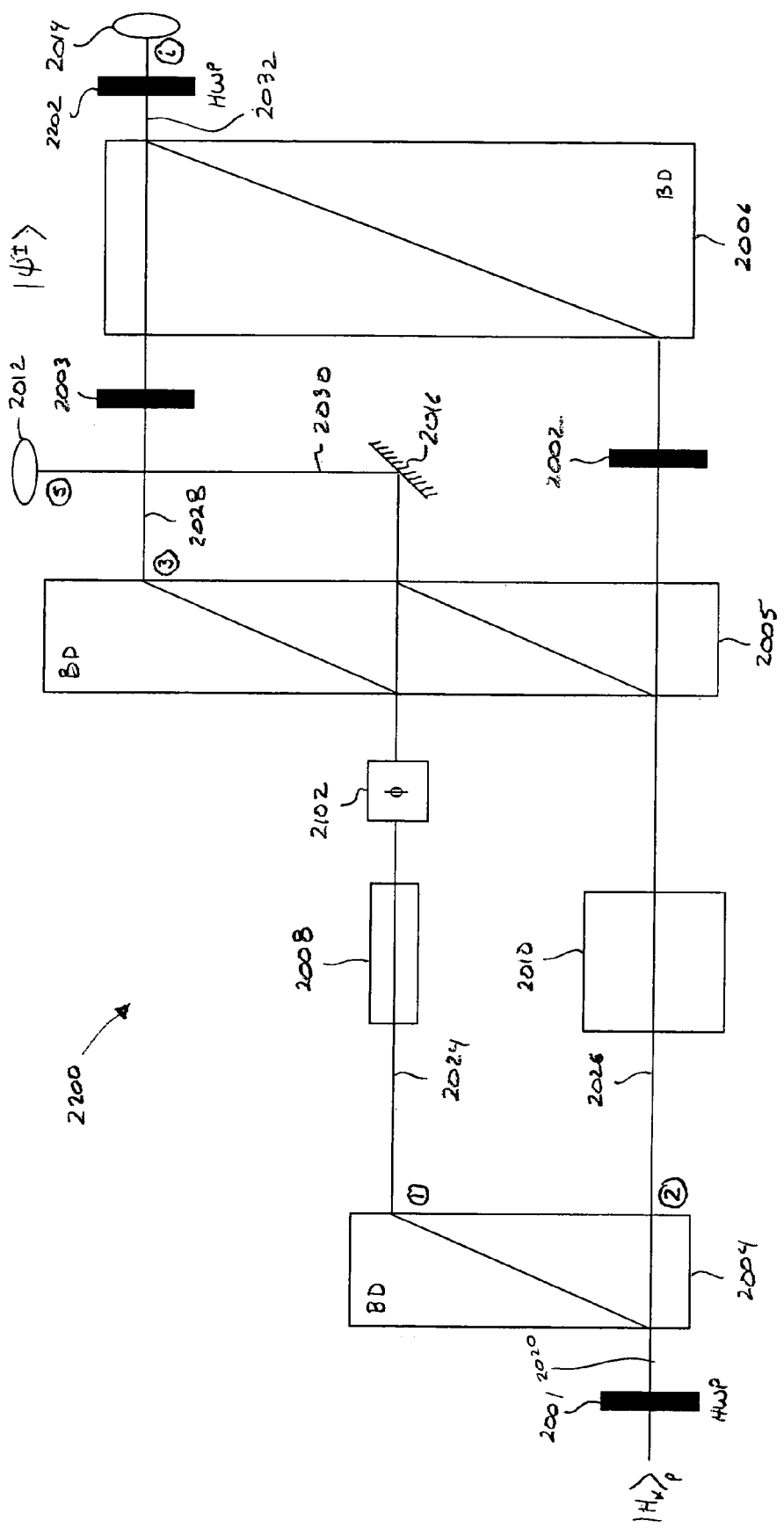
FIG. 22 illustrates a schematic plan view of the second degenerate polarization entangled-photon source shown in FIG. 20 that includes a half-wave plate in an idler beam transmission channel that represents an embodiment of the present invention.

In an alternate embodiment of the present invention, the entangled-photon polarization Bell states $|\psi^+\rangle$ and $|\psi^-\rangle$ can be generated by inserting a HWP into the idler beam transmission channel 2032 of the entangled-photon source 2100. FIG. 22 illustrates a schematic plan view of a second degenerate polarization entangled-photon source 2200 that includes a HWP 2202 in the idler beam transmission channel 2028 of the entangled-photons source 2100, shown in FIG. 21, that represents an embodiment of the present invention. When the optical device 2102 is fabricated so that n is integral valued, the HWP 2202 operates on the idler photons in the Bell state $|\phi^+\rangle$ to produce polarization entangled-photons in the Bell state $|\psi^+\rangle$, and when the optical device 2102 is fabricated so that n is half-integral valued, the HWP 2202 produces polarization entangled-photons in the Bell state $|\psi^-\rangle$.

Figure 23:
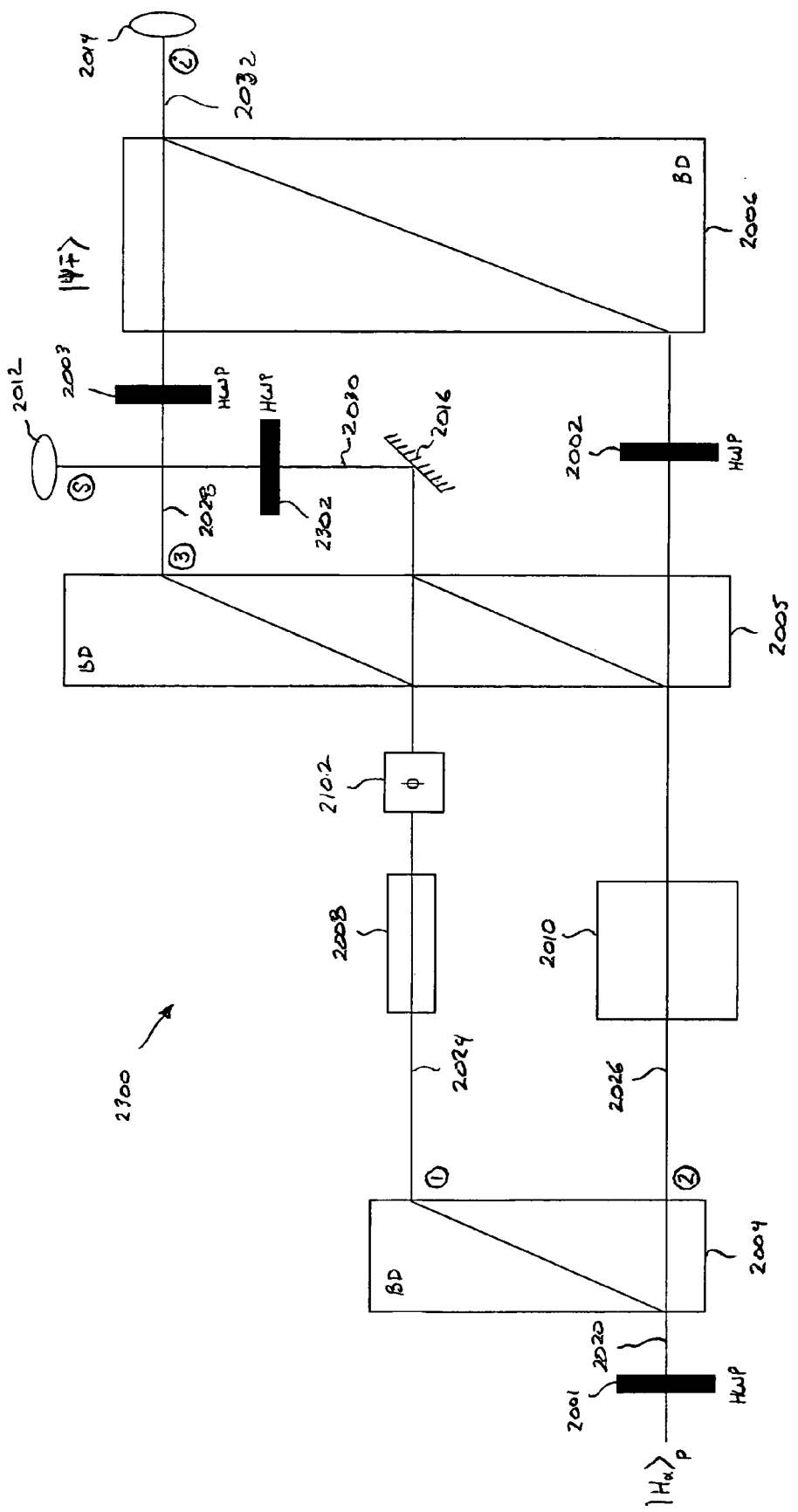
FIG. 23 illustrates a schematic plan view of the second degenerate polarization entangled-photon source shown in FIG. 20 that includes a half-wave plate in a signal beam transmission channel that represents an embodiment of the present invention.

In an alternate embodiment of the present invention, the entangled-photon polarization states $|\psi^+\rangle$ and $|\psi^-\rangle$ can also be generated by inserting a HWP into the signal beam transmission channel 2030 of the entangled-photon source 2100. FIG. 23 illustrates a schematic plan view of a second degenerate polarization entangled-photon source 2300 that includes a HWP 2302 in the signal beam transmission channel 2030 of the entangled-photon source 2100, shown in FIG. 21, that represents an embodiment of the present invention. When the optical device 2102 is fabricated so that n is integral valued, the HWP 2302 operates on the signal photons in the Bell state $|\phi^+\rangle$ to produce polarization entangled-photons in the Bell state $|\psi^+\rangle$, and when the optical device 2102 is fabricated so that n is half-integral valued, the HWP 2302 produces polarization entangled-photons in the Bell state $-|\psi^-\rangle$.

Although the present invention has been described in terms of particular embodiments, it is not intended that the invention be limited to these embodiments. Modifications within the spirit of the invention will be apparent to those skilled in the art. For example, in an alternate embodiment of the present invention, the phase difference $\theta$ can be also be corrected by tilting either the BD or the down-conversion crystals. In alternate embodiments of the present invention, chemically different Type I and Type II DCCs can be used. For example, in an alternate embodiment of the present invention, the Type I DCC 810 of the entangle-photon source 800, shown in FIG. 8, can be a periodically poled lithium niobate-magnesium oxide crystal with a poling period of about 7.73 μm. The pump beam source (not shown) can be used to generate a horizontally polarized pump beam $|H_\alpha\rangle_p$ with a wavelength of about 532 nm. The entangled-photon source 800 outputs non-degenerate signal and idler photons with wavelengths of 810 nm and 1550 nm. In an alternate embodiment of the present invention, the Type II DCC 1610 of the entangled-photon source 1600, shown in FIG. 16, can be a periodically poled lithium niobate ("LiNbO$_3$") crystal doped with magnesium oxide ("MgO") and having a poling period of about 19.48 nm. Inputting a horizontally polarized pump beam $|H_\alpha\rangle_p$ with a wavelength of about 780 nm from the pump beam source (not shown) to the entangled-photon source 1600 produces degenerate signal and idler photons both with a wavelength of about 1560 nm. In an alternate embodiment of the present invention, the Type II DCC 1610 of the entangled-photon source 1600, shown in FIG. 16, can be a periodically poled potassium titanyl phosphate ("PP-KTP") crystal with a poling period of about 7.85 μm. Inputting a horizontally polarized pump beam $|H_\alpha\rangle_p$ with a wavelength of about 380 nm from the pump beam source (not shown), the entangled-photon source 1600 produces degenerate signal and idler photons both with a wavelength of about 780 nm. In an alternate embodiment of the present invention, the Type II DCC 1610 of the entangled-photon source 1600, shown in FIG. 16, can be a PPKTP crystal with a poling period of about 60 nm. Inputting a horizontally polarized pump beam $|H_\alpha\rangle_p$ with a wavelength of about 655 nm from the pump beam source (not shown) to the entangled-photon source 1600 produces degenerate signal and idler photons both with a wavelength of about 1310 nm. In an alternate embodiment of the present invention, the HWPs 802, 1202, 1601, and 2001 describe above can be fabricated so that the horizontally polarized pump beams and the vertically polarized pump beams are in a coherent linear superposition of states:

$$\alpha|H\rangle_p + \beta|V\rangle_p$$

where $\alpha$ and $\beta$ are complex valued amplitudes satisfying the condition:

$$|\alpha|^2 + |\beta|^2 = 1$$

As a result, the state of the vertically and horizontally entangled-polarized signal and idler photons before reaching the first and second fiber optic couplers in entangled-photon sources 800, 1200, 1600, and 2000 can be represented by:

$$|\phi\rangle = \alpha|H\rangle_s|H\rangle_i + \beta e^{i\Theta}|V\rangle_s|V\rangle_i$$

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

What is claimed is:

1. A non-degenerate, polarization-entangled photon source comprising:
    a first half-wave plate that receives a pump beam from a pump beam source and outputs both a first pump beam in a first polarization state and a second pump beam in a second polarization state;
    a first beam displacer that directs the first pump beam into a first transmission channel and directs the second pump beam into a second transmission channel, based on the first and second polarization states of the first and second pump beams;
    a down-conversion device that receives the first pump beam and outputs a first signal photon and a first idler photon in the first transmission channel and receives the second pump beam and outputs a second signal photon and a second idler photon in the second transmission channel;
    a second beam displacer that directs both the first signal and idler photons transmitted in the first transmission channel and the second signal and idler photons transmitted in the second transmission channel into a single output transmission channel; and
    a dichroic mirror that receives the signal and idler photons transmitted in the output transmission channel and directs the first and second signal photons to a first fiber optic coupler and directs the first and second idler photons to a second fiber optic coupler.

2. The entangled photon source of claim 1 wherein the first polarization state is orthogonal to the second polarization state.

3. The entangle photon source of claim 1 wherein the down-conversion device further comprises:
    a second half-wave plate that receives the second pump beam in the second polarization state and outputs the second pump beam in the first polarization state;
    a Type I down-conversion crystal that receives the first pump beam and outputs the first signal photon and the first idler photon both in the first polarization state and receives the second pump beam and outputs the second signal photon and the second idler photon both in the first polarization state; and
    a third half-wave plate that receives the first signal photon and the first idler photon both in the first polarization state and outputs the first signal photon and first idler photon both in the second polarization state.

4. The entangled-photon source of claim 3 wherein the Type I down-conversion crystal further comprises one of;
    a periodically poled lithium niobate crystal;
    a periodically poled lithium niobate crystal doped with magnesium oxide; and
    a periodically poled potassium titanyl phosphate crystal.

5. The entangled photon source of claim 1 wherein the down-conversion device further comprises:
    a first Type I down-conversion crystal that receives the first pump beam and outputs the first signal photon and the first idler photon both in the second polarization state; and
    a second Type I down-conversion crystal that receives the second pump beam and outputs the second signal photon and the second idler photon both in the first polarization state.

6. The entangled photon source of claim 5 wherein the first transmission channel passing through the first Type I down-conversion crystal and the second transmission channel passing through the second Type I down-conversion crystals are parallel, and the second Type I down-conversion crystal is rotated 90° about the second transmission channel based on the orientation of the first Type I down-conversion crystal.

7. The entangled-photon source of claim 5 wherein the Type I down-conversion crystal further comprises one of:
    a periodically poled lithium niobate crystal;
    a periodically poled lithium niobate crystal doped with magnesium oxide; and
    a periodically poled potassium titanyl phosphate crystal.

8. The entangled-photon source of claim 7 further comprising a half-wave plate located between the dichroic mirror and the fiber optic coupler that changes the polarization state of the first signal photon and the second signal photon.

9. The entangle-photon source of claim 7 further comprising a half-wave plate located between the dichroic mirror and the second fiber optic coupler that changes the polarization state of the first idler photon and the second idler photon.

10. The entangled-photon source of claim 1 further comprising an optical device located in either the first, or the second, transmission channel that adjusts for an acquired channel-dependent phase difference.

11. The entangled-photon source of claim 1 wherein the first and second beam displacers further comprise a birefringent material.

12. A degenerate, polarization-entangled photon source comprising:
a first half-wave plate that receives a pump beam from a pump beam source and outputs both a first pump beam in a first polarization state and a second pump beam in a second polarization state;
a first beam displacer that directs the first pump beam into a first transmission channel and directs the second pump beam into a second transmission channel, based on the first and second polarization states of the first and second pump beams;
a down-conversion device that receives the first pump beam and outputs a first signal photon and a first idler photon in the first transmission channel and receives the second pump beam and outputs a second signal photon and a second idler photon in the second transmission channel;
a second beam displacer that directs the first and second signal photons to the first transmission channel, directs the first idler photon to a third transmission channel, and transmits the second idler in the second transmission channel;
a mirror that directs the first and second signal photons to a first fiber optic coupler; and
a third beam displacer that directs the first and second idler photons to a second fiber optic coupler.

13. The entangled photon source of claim 12 wherein the first polarization state is orthogonal to the second polarization state.

14. The entangled photon source of claim 12 wherein the down-conversion device further comprises;
a second half-wave plate that receives the second pump beam in the second polarization state and outputs the second pump beam in the first polarization state;
a Type II down-conversion crystal that receives the first pump beam and outputs a first signal photon with the second polarization and a first idler photon with the first polarization, and receives the second pump beam and outputs a second signal photon with the second polarization and a second idler photon with the first polarization; and
a third half-wave plate that receives the second signal photon and the second idler photon and outputs the second signal photon with the first polarization and the second idler photon with the second polarization.

15. The entangled-photon source of claim 14 wherein the Type II down-conversion crystal further comprises one of:
a periodically poled lithium niobate crystal;
a periodically poled lithium niobate crystal doped with magnesium oxide; and
a periodically poled potassium titanyl phosphate crystal.

16. The entangled photon source of claim 12 further comprises:
a four half-wave plate located between the second beam displacer and the third beam displacer that receives the first idler photon and outputs the first idler photon in the second polarization state; and
a fifth half-wave plate located between the second beam displacer and the third beam displacer that receives the second idler photon and outputs the second idler photon in the first polarization state.

17. The entangled photon source of claim 12 wherein the down-conversion device further comprises:
a first Type II down-conversion crystal that receives the first pump beam and outputs the first signal photon and the first idler photon both in the second polarization state; and
a second Type II down-conversion crystal that receives the second pump beam and outputs the second signal and the second idler photons both in the first polarization state.

18. The entangled photon source of claim 17 wherein the first transmission channel passing through the first Type II down-conversion crystal and the second transmission channel passing through the second Type II down-conversion crystals are parallel, and the second Type II down-conversion crystal is rotated 90° about the second transmission channel based on the orientation of the first Type II down-conversion crystal.

19. The entangled-photon source of claim 17 wherein the Type II down-conversion crystal further comprises one of:
a periodically poled lithium niobate crystal;
a periodically poled lithium niobate crystal doped with magnesium oxide; and
a periodically poled potassium titanyl phosphate crystal.

20. The entangled-photon source of claim 12 further comprising an optical device located in the second transmission channel that adjusts for an acquired channel-dependent phase difference.

21. The entangled-photon source of claim 20 further comprising a half-wave plate located between the mirror and the first fiber optic coupler that changes polarization of the signal photons.

22. The entangle-photon source of claim 20 further comprising a half-wave plate located between the third beam displacer and the second fiber optic coupler that changes polarization of the idler photons.

23. The entangled-photon source of claim 12 wherein the first and second beam displacers further comprise a birefringent material.

* * * * *

UNITED STATES PATENT AND TRADEMARK OFFICE
CERTIFICATE OF CORRECTION

PATENT NO. : 7,639,953 B2  Page 1 of 1
APPLICATION NO. : 11/494815
DATED : December 29, 2009
INVENTOR(S) : Sean Spillane et al.

It is certified that error appears in the above-identified patent and that said Letters Patent is hereby corrected as shown below:

In column 22, line 27, in Claim 4, delete "of;" and insert -- of: --, therefor.

In column 23, line 34, in Claim 14, delete "comprises;" and insert -- comprises: --, therefor.

Signed and Sealed this

Sixth Day of April, 2010

David J. Kappos
*Director of the United States Patent and Trademark Office*